US012659792B2

(12) United States Patent (10) Patent No.: US 12,659,792 B2

Bahl et al. (45) Date of Patent: Jun. 16, 2026

(54) END-TO-END SECURE COMMUNICATIONS FOR PRIVILEGED 5G NETWORK TRAFFIC

(71) Applicant: Microsoft Technology Licensing, LLC, Redmond, WA (US)

(72) Inventors: Paramvir Bahl, Bellevue, WA (US); Rachee Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 18/500,302

(22) Filed: Nov. 2, 2023

(65) Prior Publication Data

US 2024/0114382 A1 Apr. 4, 2024

Related U.S. Application Data

(63) Continuation of application No. 17/554,252, filed on Dec. 17, 2021, now Pat. No. 11,838,789.

(51) Int. Cl.
| | |
|---|---|
| *H04W 28/02* | (2009.01) |
| *H04J 14/02* | (2006.01) |
| *H04L 5/00* | (2006.01) |
| *H04W 12/08* | (2021.01) |
| *H04W 12/12* | (2021.01) |
| *H04W 28/24* | (2009.01) |

(52) U.S. Cl.
CPC ..... *H04W 28/0268* (2013.01); *H04J 14/0257* (2013.01); *H04L 5/001* (2013.01); *H04W 12/08* (2013.01); *H04W 12/12* (2013.01); *H04W 28/24* (2013.01)

(58) Field of Classification Search
CPC . H04W 28/0268; H04W 28/24; H04W 12/08; H04W 12/12; H04J 14/0257; H04L 5/001
USPC .......................................................... 398/79
See application file for complete search history.

(56) References Cited

U.S. PATENT DOCUMENTS

| | | | | |
|---|---|---|---|---|
| 8,447,181 | B2 * | 5/2013 | Jenkins ............... | H04J 14/0246 |
| | | | | 370/254 |
| 10,159,010 | B1 * | 12/2018 | Smith ............... | H04W 28/0268 |
| 11,444,851 | B2 * | 9/2022 | Young ................. | H04L 41/5009 |
| 11,463,327 | B2 * | 10/2022 | Chen ....................... | H04L 43/20 |

(Continued)

*Primary Examiner* — Dalzid E Singh
(74) *Attorney, Agent, or Firm* — ArentFox Schiff LLP

(57) ABSTRACT

Software-defined networking and network function virtualization constructs are leveraged across diverse portions of 5G network infrastructure including radio access network, mobile core, and wide area network to enable a security property to be implemented for a network slice from end-to-end to provide for strong logical and/or physical isolation of slice traffic from other network traffic. One or more network slice controllers are implemented in the 5G network that are interoperable as separate elements, or under centralized control, to enable the underlying diverse network infrastructure to be abstracted and virtualized so that infrastructure properties can be mapped across infrastructure types for the end-to-end slice. Network resources may be dynamically allocated based on real-time traffic demands to instantiate the end-to-end network slices on a customized basis to meet particular quality of service parameters for various traffic types, including privileged traffic that may be prioritized when resources become scarce and network congestion occurs.

20 Claims, 32 Drawing Sheets

(56) References Cited

U.S. PATENT DOCUMENTS

| | | | |
|---|---|---|---|
| 11,622,252 B2* | 4/2023 | Zhang | H04L 63/123 |
| | | | 455/414.1 |
| 2018/0184413 A1* | 6/2018 | Rong | H04W 28/0247 |
| 2019/0174320 A1* | 6/2019 | Kodaypak | H04L 41/00 |
| 2020/0068430 A1* | 2/2020 | Chan | H04L 47/11 |
| 2021/0297857 A1* | 9/2021 | Obaidi | H04W 12/37 |
| 2022/0182332 A1* | 6/2022 | Christofi | H04L 41/40 |
| 2023/0142350 A1* | 5/2023 | Priya | H04W 48/18 |
| | | | 370/329 |

* cited by examiner

100

300

500

500

1100

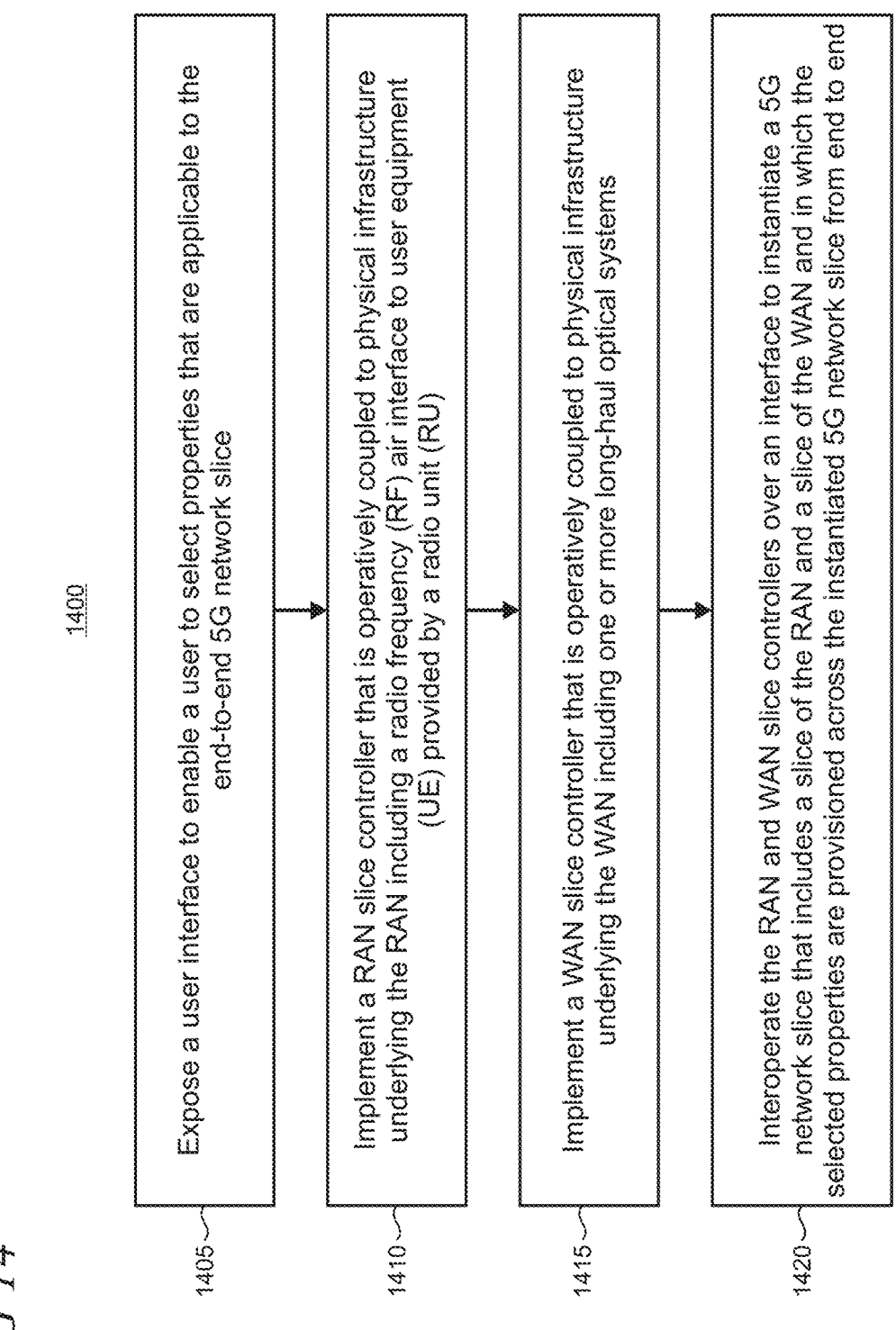

1405 — Expose a user interface to enable a user to select properties that are applicable to the end-to-end 5G network slice 1410 — Implement a RAN slice controller that is operatively coupled to physical infrastructure underlying the RAN including a radio frequency (RF) air interface to user equipment (UE) provided by a radio unit (RU)

1415 — Implement a WAN slice controller that is operatively coupled to physical infrastructure underlying the WAN including one or more long-haul optical systems 1420 — Interoperate the RAN and WAN slice controllers over an interface to instantiate a 5G network slice that includes a slice of the RAN and a slice of the WAN and in which the selected properties are provisioned across the instantiated 5G network slice from end to end

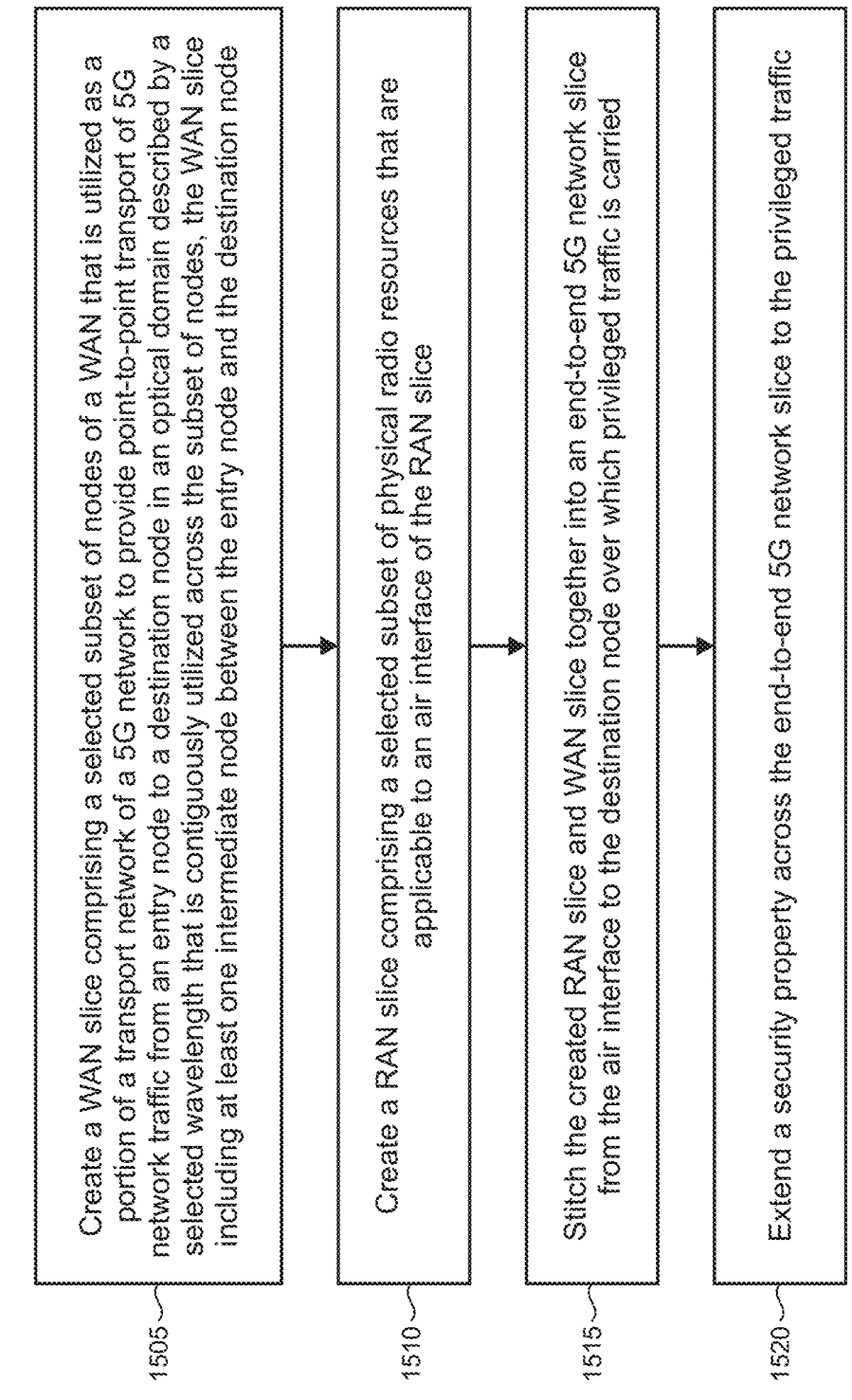

1505 — Create a WAN slice comprising a selected subset of nodes of a WAN that is utilized as a portion of a transport network of a 5G network to provide point-to-point transport of 5G network traffic from an entry node to a destination node in an optical domain described by a selected wavelength that is contiguously utilized across the subset of nodes, the WAN slice including at least one intermediate node between the entry node and the destination node 1510 — Create a RAN slice comprising a selected subset of physical radio resources that are applicable to an air interface of the RAN slice 1515 — Stitch the created RAN slice and WAN slice together into an end-to-end 5G network slice from the air interface to the destination node over which privileged traffic is carried 1520 — Extend a security property across the end-to-end 5G network slice to the privileged traffic

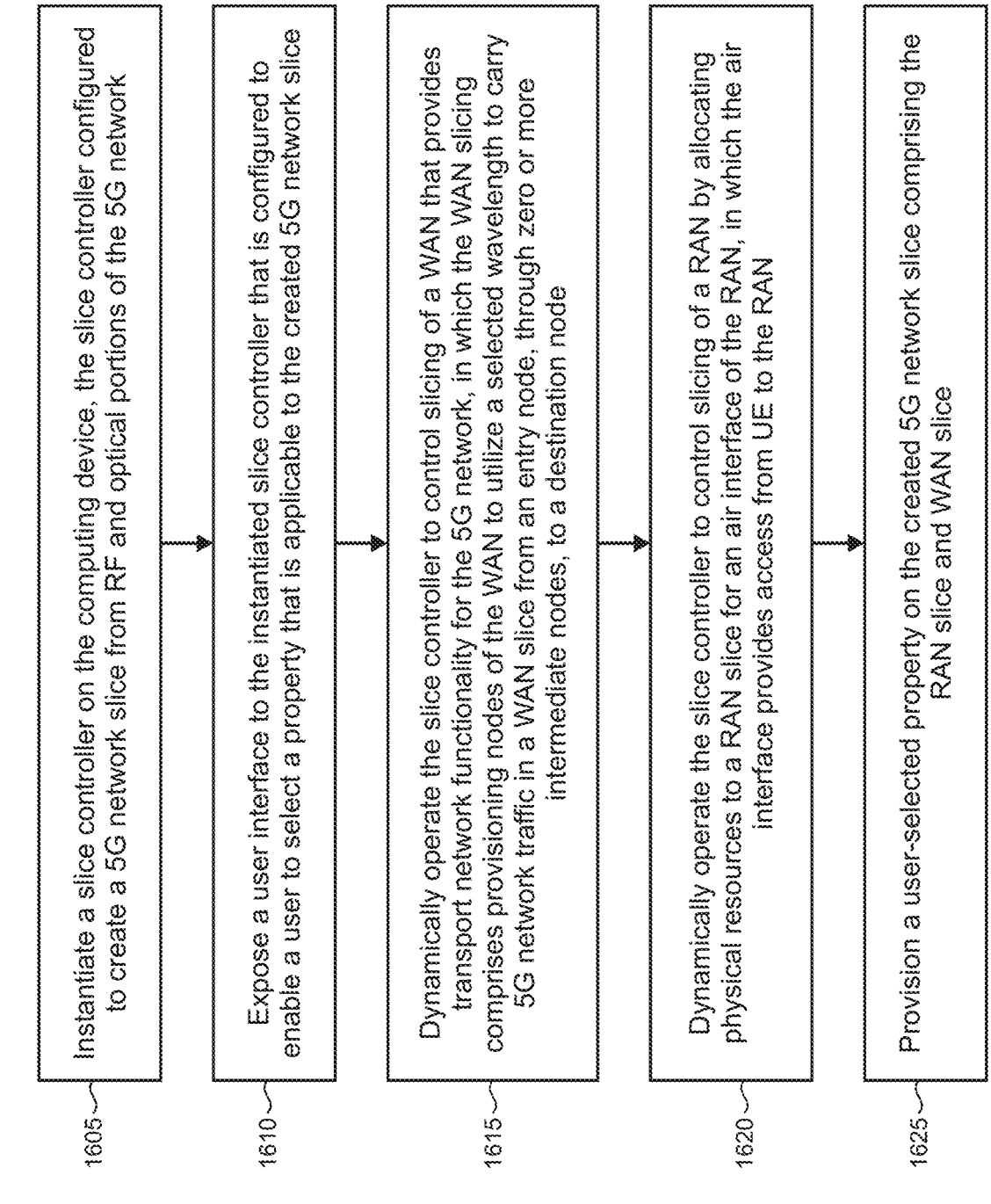

1605 — Instantiate a slice controller on the computing device, the slice controller configured to create a 5G network slice from RF and optical portions of the 5G network 1610 — Expose a user interface to the instantiated slice controller that is configured to enable a user to select a property that is applicable to the created 5G network slice 1615 — Dynamically operate the slice controller to control slicing of a WAN that provides transport network functionality for the 5G network, in which the WAN slicing comprises provisioning nodes of the WAN to utilize a selected wavelength to carry 5G network traffic in a WAN slice from an entry node, through zero or more intermediate nodes, to a destination node 1620 — Dynamically operate the slice controller to control slicing of a RAN by allocating physical resources to a RAN slice for an air interface of the RAN, in which the air interface provides access from UE to the RAN 1625 — Provision a user-selected property on the created 5G network slice comprising the RAN slice and WAN slice

1900

2200

○ = Datacenter (e.g.,central and edge) (2205)

— = Long haul optical system ⎤ 2210

····· = Future deployment ⎦

2300

CNR = core network room
DC = data center
WAN = wide area network

2400

RNG = regional network gateway
DC = data center
WAN = wide area network
AZ = availability zone

2500

2600

MDM = multiplexing/demultiplexing optics
WSS = wavelength selective switch
OLT = optical line terminal
WAN = wide area network

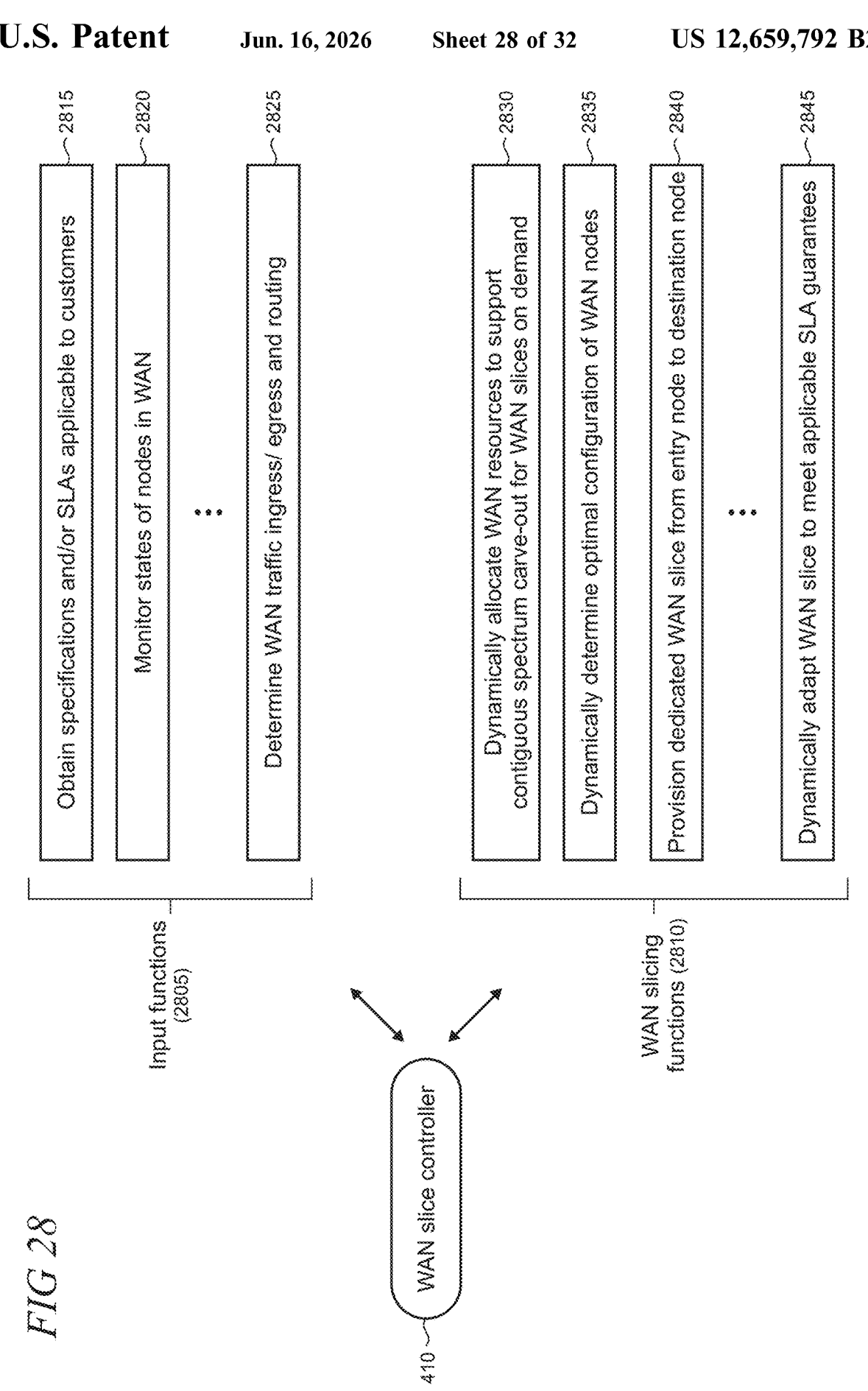

*FIG 28*

Input functions (2805)

Obtain specifications and/or SLAs applicable to customers — 2815

Monitor states of nodes in WAN — 2820

• • •

Determine WAN traffic ingress/ egress and routing — 2825

WAN slicing functions (2810)

Dynamically allocate WAN resources to support contiguous spectrum carve-out for WAN slices on demand — 2830

Dynamically determine optimal configuration of WAN nodes — 2835

Provision dedicated WAN slice from entry node to destination node — 2840

• • •

Dynamically adapt WAN slice to meet applicable SLA guarantees — 2845

WAN slice controller — 410

END-TO-END SECURE COMMUNICATIONS FOR PRIVILEGED 5G NETWORK TRAFFIC

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

Software-defined networking (SDN) and network function virtualization (NFV) constructs are leveraged across diverse portions of 5G network infrastructure including radio access network (RAN), mobile core, and wide area network (WAN) to enable a security property to be implemented for a network slice from end-to-end to provide for strong logical and/or physical isolation of slice traffic from other network traffic. One or more network slice controllers are implemented in the 5G network that are interoperable as separate elements, or under centralized control, to enable the underlying diverse network infrastructure to be abstracted and virtualized so that infrastructure properties can be mapped across infrastructure types for the end-to-end slice. Network resources may be dynamically allocated based on real-time traffic demands to instantiate the end-to-end network slices on a customized basis to meet particular quality of service (QoS) parameters for various traffic types, including privileged traffic that may be prioritized when resources become scarce and network congestion occurs.

In various illustrative examples, an SDN-implemented slice controller exposes a user interface (UI) that enables a customer or administrator to select end-to-end properties to be applied to a network slice. The slice controller monitors current RAN and WAN state to dynamically allocate resources to configure the slice with the selected end-to-end properties in view of the properties of the available underlying RAN and WAN infrastructure. For example, the end-to-end slice properties can deal with one or more of QoS, privilege/priority, security, privacy, or customer policy. The RAN and WAN properties may include those that are common across infrastructure types such as throughput, latency, availability, and error rate. Properties can also be unique to each type of infrastructure—for example, radio frequency (RF) spectrum and energy utilization in the RAN, and fiber routing and wavelength selection in the WAN. The slice controller may be configured to optimally map both the common and unique properties between the RAN and WAN in a dynamic manner in real time to support a guarantee for end-to-end security or other slice service level or metric.

Advantageously, the present principles provide customers with dedicated capacity that isolates slice traffic from other co-existing traffic on the 5G network. Strong security, QoS, and other guarantees may be provided to customers to support a variety of differentiated service offerings. The slice controller may be dynamically operated to provide specific network slice capabilities and features in a flexible, demand-oriented manner to provide 5G services having different and customized characteristics while optimally utilizing available infrastructure resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 14, 15, and 16 show illustrative methods that may be performed when implementing the present end-to-end secure communications for privileged 5G network traffic;

FIG. 28 shows illustrative input and slicing functions that may be performed by the WAN slice controller;

FIG. 32 is a simplified block diagram of an illustrative computer system that may be used at least in part to implement the present end-to-end secure communications for privileged 5G network traffic.

Like reference numerals indicate like elements in the drawings. Elements are not drawn to scale unless otherwise indicated.

Figure 1:
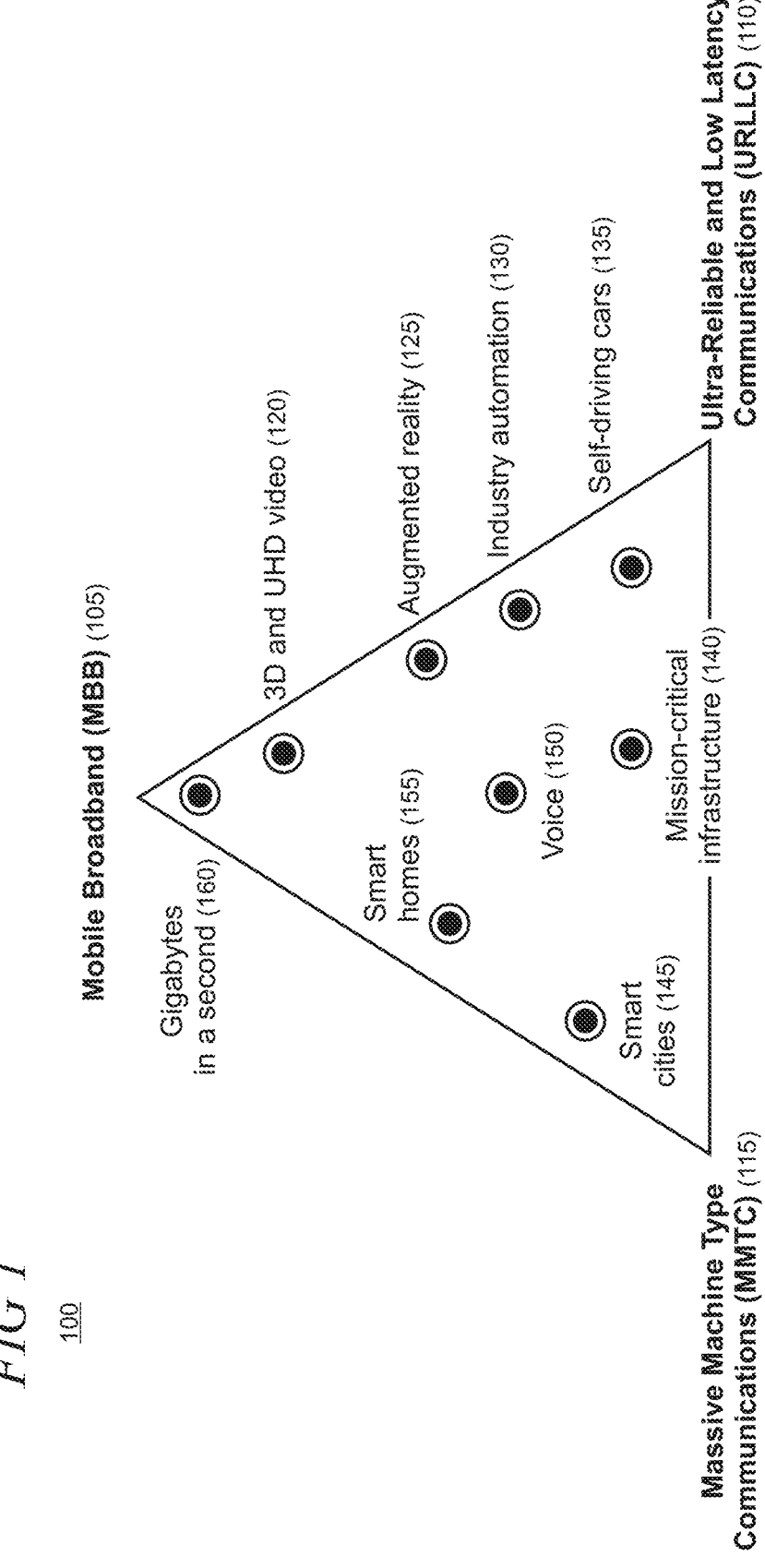
FIG. 1 shows illustrative 5G network usage scenario examples.

DETAILED DESCRIPTION 5G mobile networks utilize a service-based architecture that supports data connectivity and services enabling deployments using techniques such as, for example, network function virtualization (NFV), software-defined networking (SDN), and cloud computing. Some exemplary features and concepts of 5G networking include separating User Plane (UP) functions from Control Plane (CP) functions to enable independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay-sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
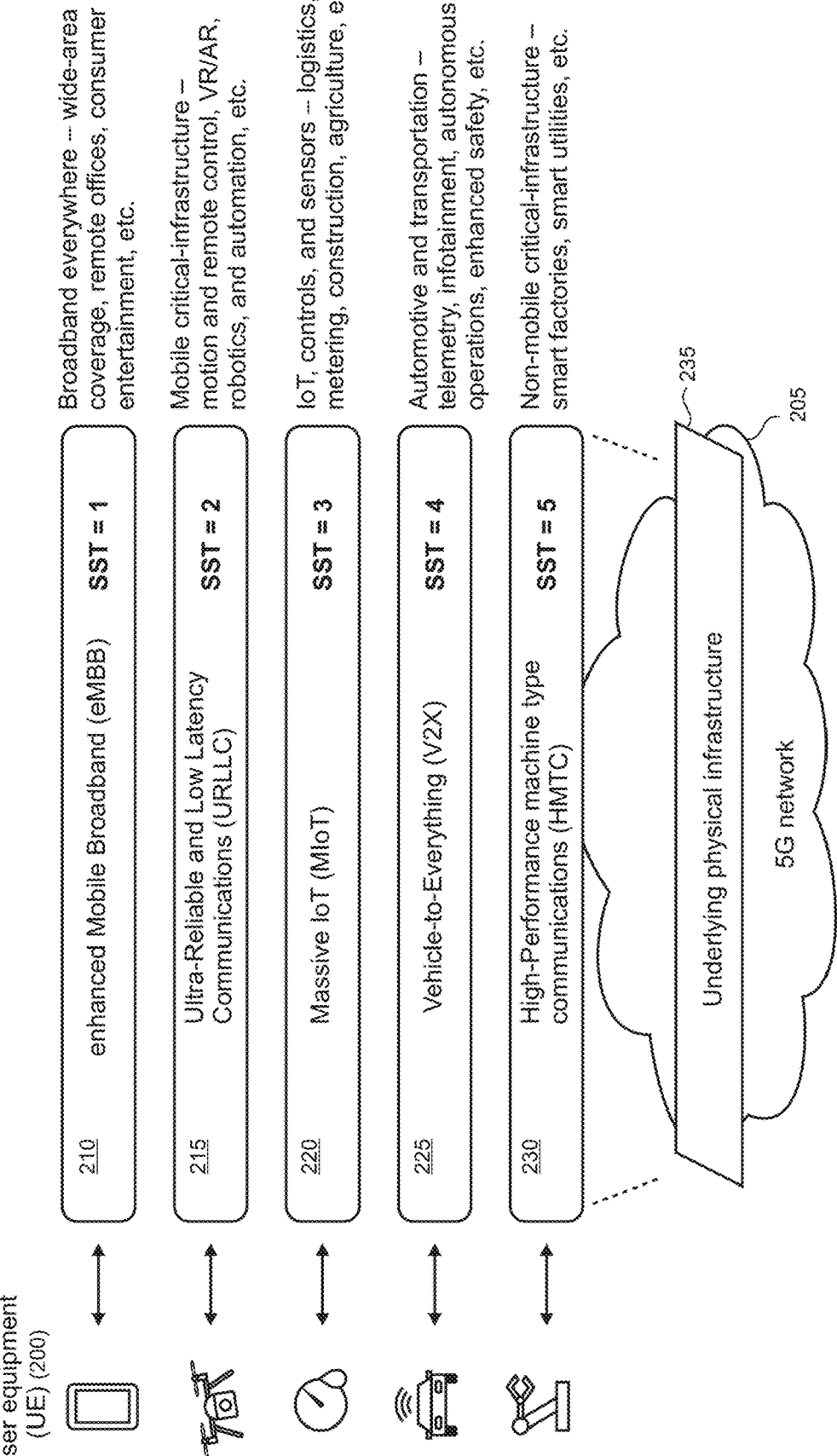
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
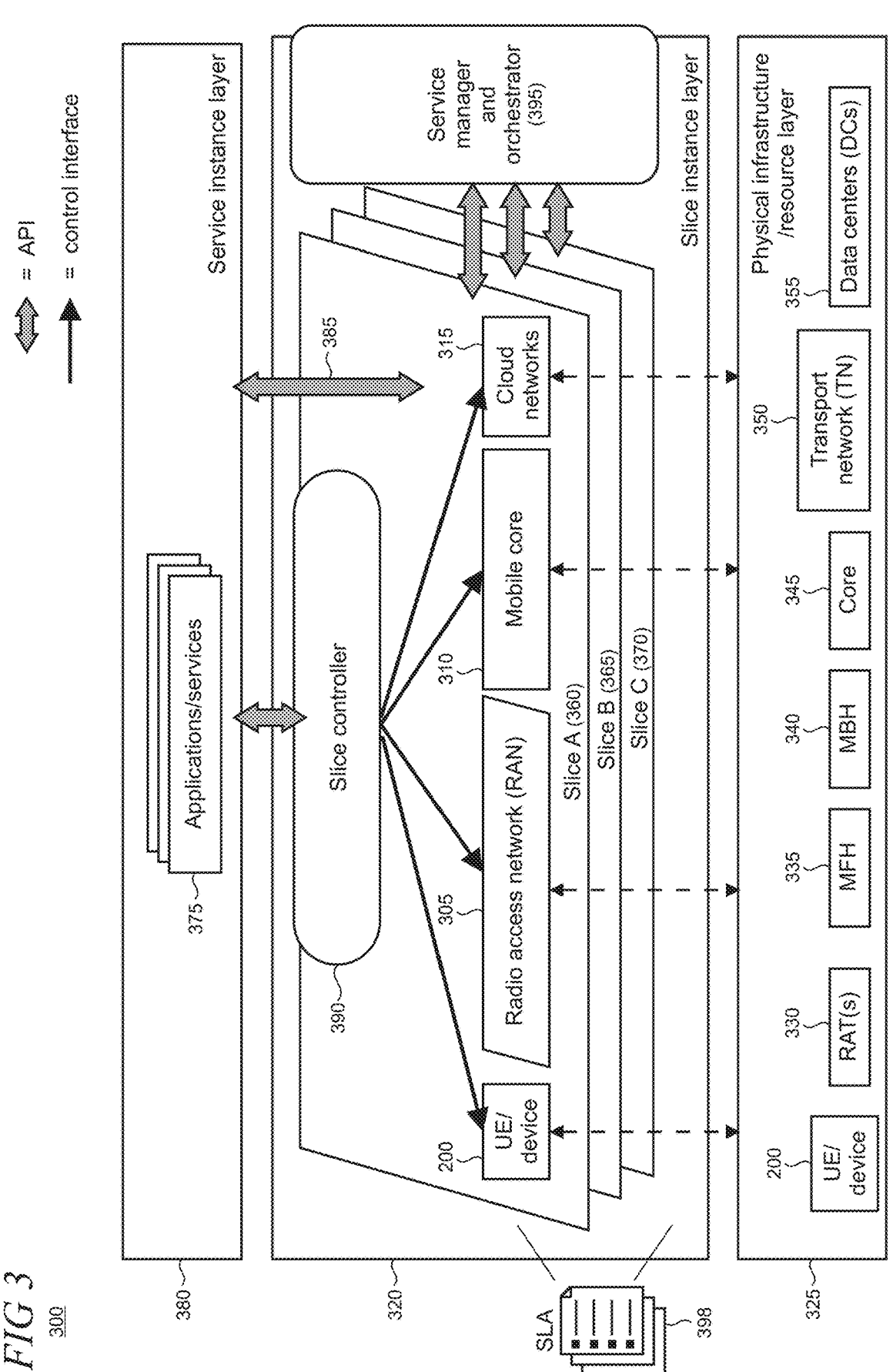
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport network (TN) 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or may comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context, and maintaining communications between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality.

Various types of customers can be supported by the present end-to-end secure communications for privileged 5G network traffic, typically depending on applicable circumstances and context. For example, customers may include, but are not limited to consumers (i.e., end users), businesses, enterprises, organizations, service providers, application developers, application providers, mobile network operators, internet service providers, and the like. A customer may support its own services to customers (e.g., end users) as well as services sourced from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee and low latency under a corresponding SLA, while enhanced MBB resources may be readily scaled downward once the edge cloud buffering is complete.

Figure 4:
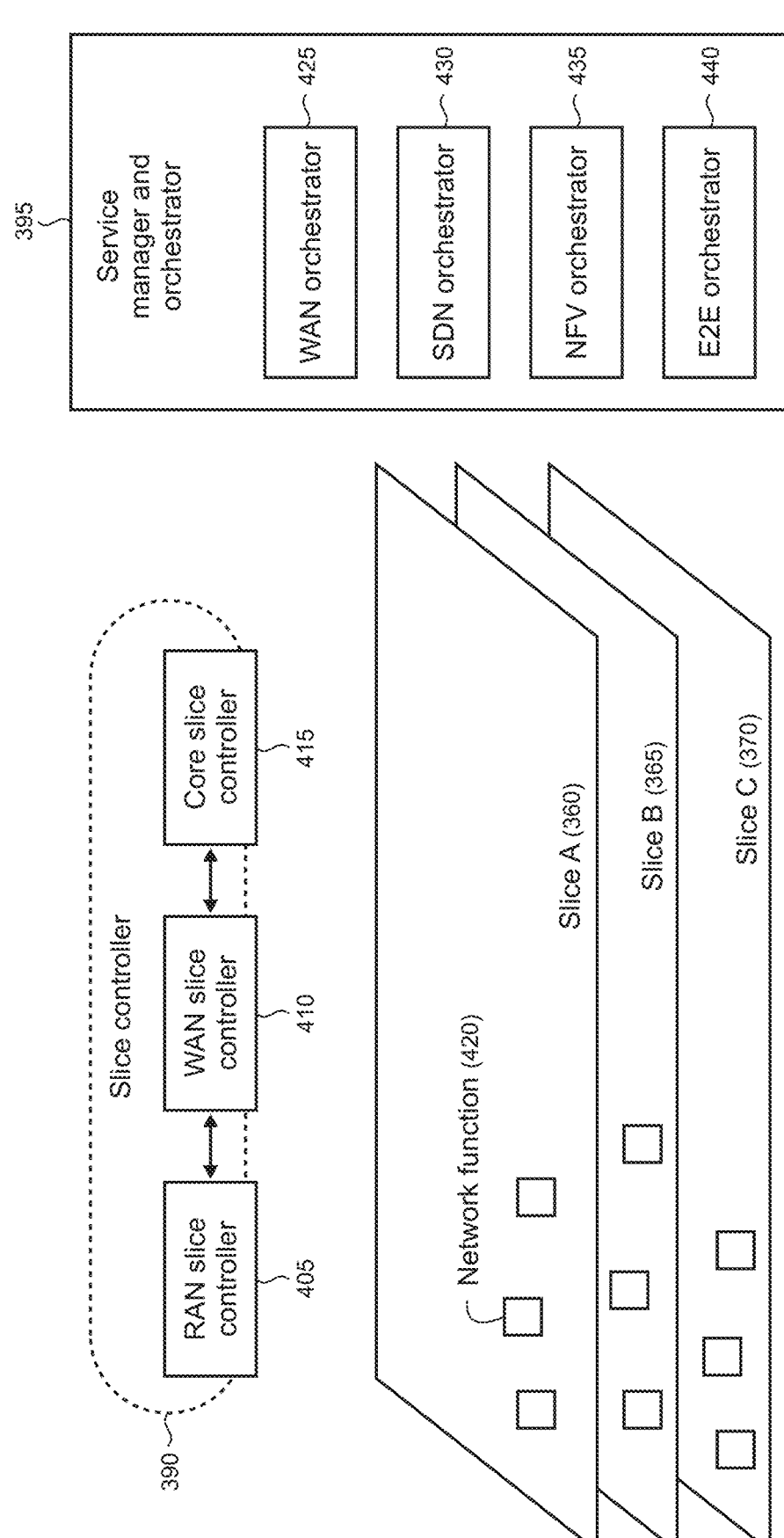
FIG. 4 shows illustrative details of a slice controller and service manager and orchestrator.

FIG. 4 shows illustrative details of the slice controller 390 and service manager and orchestrator 395. The slice controller may include constituent slicing components including a RAN slice controller 405, a WAN slice controller 410, and a core slice controller 415 in some applications, as discussed below in the text accompanying FIG. 9. The RAN, WAN, and core slice controllers may also be separately instantiated or be instantiated together in various combinations. Typically, the individual controllers are implemented as SDN (software-defined networking) components. It may also be appreciated that the functionalities of the slice controllers may be combined with or distributed among components in the slicing architecture differently from what is shown in the drawings.

Each slice controller may be particularly adapted in view of the different characteristics of the various technical domains including the RAN, core network, and transport network (e.g., WAN). Accordingly, each slice 360, 365, and 370 includes virtual network functions (representatively indicated by reference numeral 420) including, for example, radio access functions and core network functions. For example, the core network and RAN slicing related network functions are described in the 3GPP standards. Operations of the WAN slice controller are described in more detail in the text accompanying FIGS. 10-13. Operations of the RAN slice controller are described in more detail in the text accompanying FIGS. 19 and 20. While each slice controller may perform functions independently from other systems, they are linked to effectuate end-to-end 5G network slicing in accordance with the present principles as discussed below in the text beginning at FIG. 7.

As shown in FIG. 4, the service manager and orchestrator 395 supports a WAN orchestrator 425 that is configured for responsibility for WAN resource control and management. An SDN orchestrator 430 provides programmatic capabilities for automating behaviors and policies in the 5G network including the control of switches and routers that support various services and applications. An NFV (network function virtualization) orchestrator 435 is responsible for network service/network function lifecycle management to deploy virtual network functions among slices for core slicing. An end-to-end (E2E) orchestrator 440 is configured to provide orchestration services for automated slicing across domains including the RAN, mobile core, and transport network.

Figure 5:
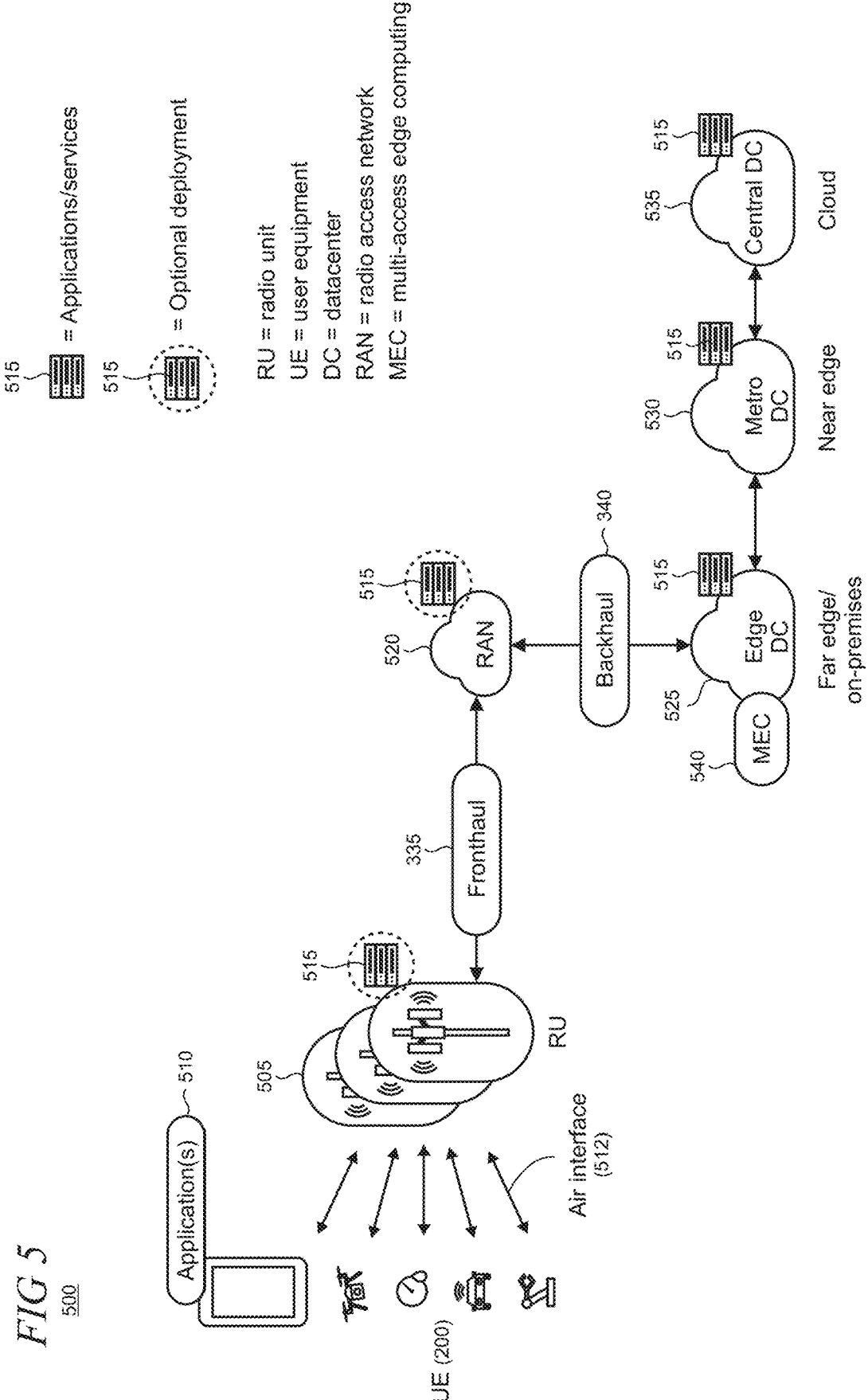
FIG. 5 shows illustrative physical infrastructure in a 5G network architecture.

FIG. 5 shows illustrative physical infrastructure in a 5G network 500. Multiple instances of a radio unit (RU) 505 are configured to interact with a diverse population of UE 200 over an air interface 512 of the 5G network. Each UE typically includes one or more local/client applications 510 or client-side software/firmware component that is arranged to interface with one or more remote application servers, service providers, or other resources (collectively indicated by reference numeral 515) and thus require network connectivity to such remote facilities.

The RUs are coupled by the mobile fronthaul 335 to a RAN 520. The RAN is coupled by the mobile backhaul 340 to one or more data centers (DCs). In this illustrative example, the DCs comprise an edge DC 525, a metro DC 530, and a central DC 535. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 540.

The application servers 515 can be located at various points in the network architecture 500 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 520 or RU 505, as indicated by the dashed circles in FIG. 5.

Figure 6:
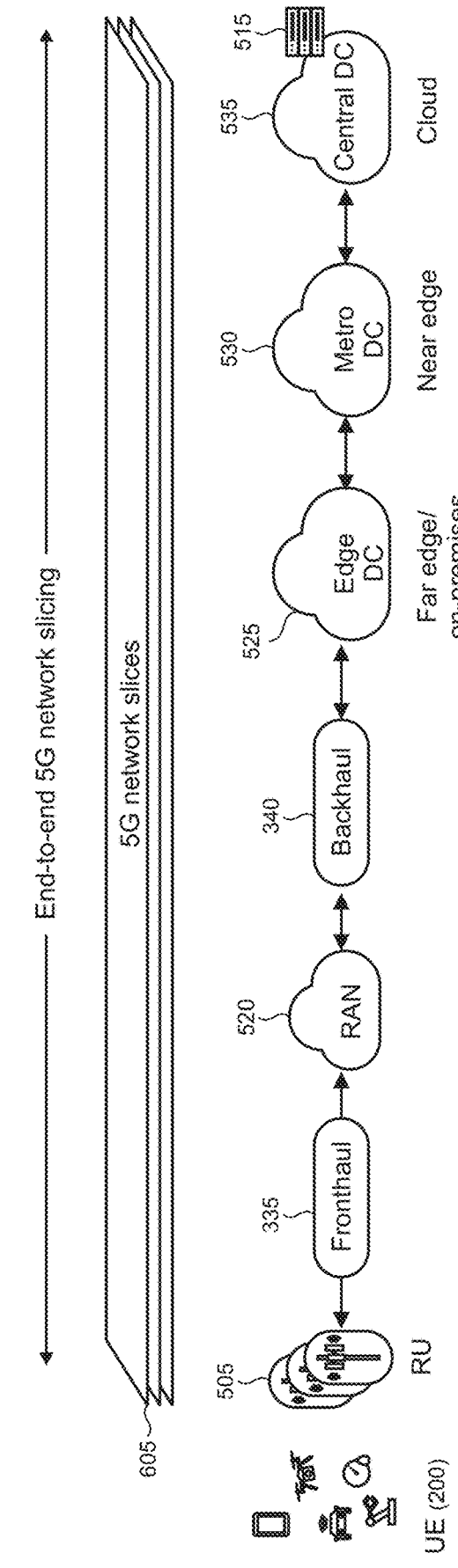
FIG. 6 shows illustrative 5G network slices that extend end-to-end on a 5G network.

FIG. 6 shows illustrative 5G network slices 605 that extend end-to-end on a 5G network 500. As shown, the slicing construct used at the RAN 520 is extended through to WAN infrastructure that may be utilized as the transport network portion 350 (FIG. 3) of the 5G network. The term "WAN" as used herein generally refers to a combination of physical transport media and switching and/or routing functionalities, however, the term may also have alternative meanings depending on applicable context, or when given an explicit definition. The physical transport media typically comprise fiber optic systems and/or satellite communication systems but are not necessarily limited to such systems. Likewise, switching/routing can be performed in various portions of the 5G network, including DCs, but such functions are not necessarily limited to performance in DCs. A given WAN can be provided, for example, by one or more of cloud service provider, mobile network operator, internet service provider, TN service provider, PSTN (public-switched telecommunications network) provider, network service provider, telecommunications provider, backbone provider, cable television provider, various combinations thereof, or the like.

The end-to-end network slicing may be implemented in different 5G network scenarios. In a first scenario, multiple different entities own and/or control different parts of the 5G network infrastructure. For example, a mobile network operator may operate a RAN portion of the network while a cloud network operator may operate a WAN portion of the network. Network functions in the core network could be provided by either or both operators in this scenario. The 5G network may therefore be viewed as being interoperated in two domains—mobile network and cloud network—and the first scenario comprises an inter-domain scenario.

Figure 7:
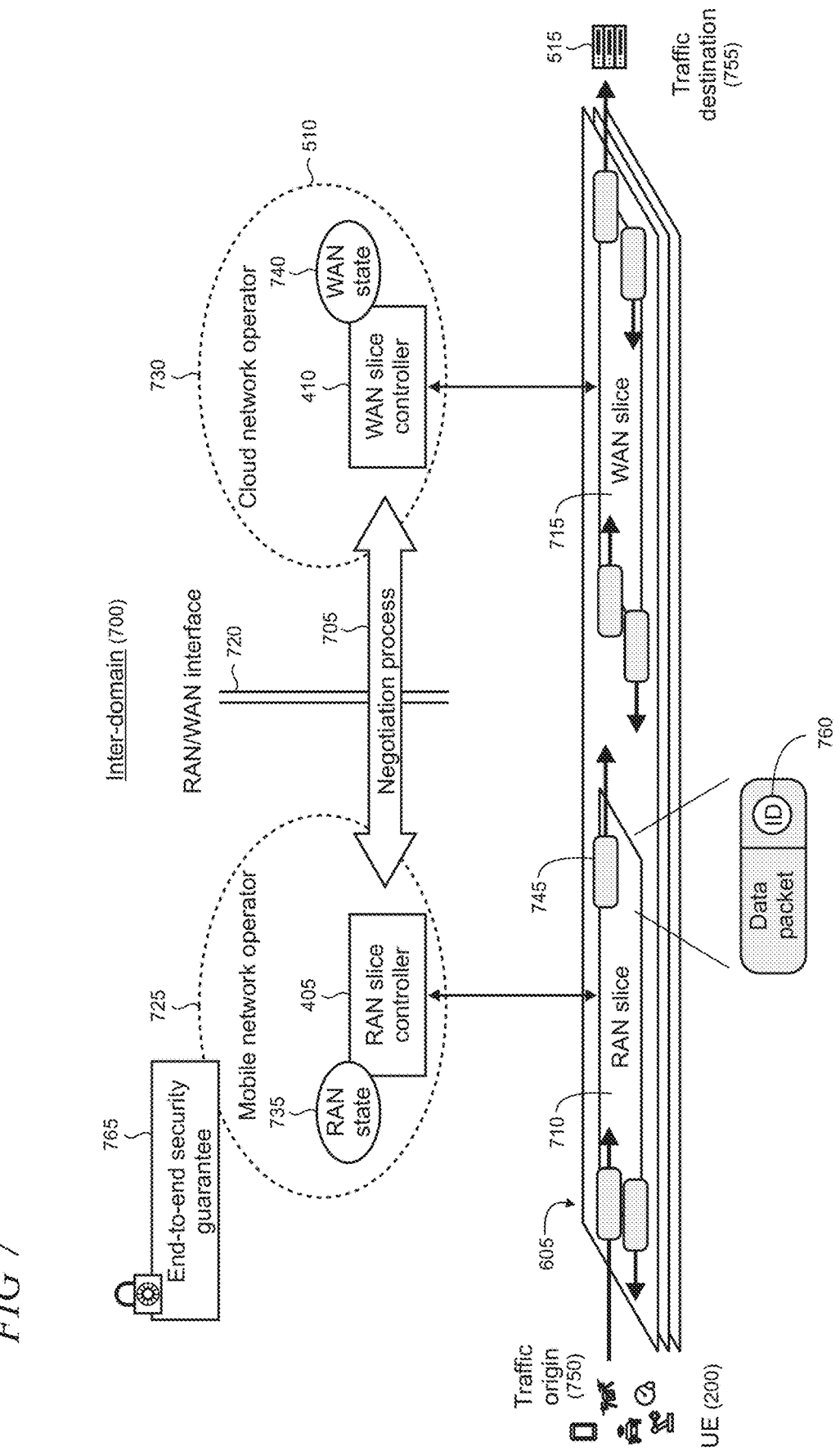
FIGS. 7 and 8 shows an illustrative inter-domain arrangement in which a radio access network (RAN) slice controller and a wide access network (WAN) slice controller engage in negotiations for a communications session in which data packets are exchanged.

FIG. 7 shows an illustrative inter-domain arrangement 700 in which a RAN slice controller 405 and a WAN slice controller 410 engage in a negotiation process 705 for a communications session in which data packets are exchanged between a RAN slice 710 and a WAN slice 715. The slice controllers are configured to engage in negotiations over an RAN/WAN interface 720 which exposes various methods and supports the appropriate hardware abstractions to enable the controllers in different domains—mobile network operator 725 and cloud network operator 730 in this example—to interoperate to stitch together an end-to-end slice 605 having predetermined characteristics such as for security, service level, or technical performance metrics. Each slice controller maintains knowledge of its own state, as respectively indicated by reference numerals 735 and 740, which is typically not shared across domains.

Traffic is typically bidirectional in a given communications session with data packets, representatively indicated by reference numeral 745, traversing both directions of the RAN and WAN slices. In this example, the origin 750 of the traffic is on a RAN side of the 5G network, and the destination 755 is on a WAN side of the network. A UE 200 may initiate communications, for example, with a cloud-based application server 515, send user interface data, upload data, etc., during a communications session. In this particular illustrative example, the communications comprise privileged traffic per an applicable SLA for which an end-to-end security guarantee 765 or other service level or metric is ensured by the mobile network operator 725.

It is noted that, depending on a given context and circumstances, either domain entity can be the end-to-end security guarantee provider, or the provider may be a third party entity. In some implementations of the present principles, providing the guarantee can be a shared responsibility, or an entity can take responsibility for the guarantee on behalf of another entity. Typically, the responsibility for the guarantee includes commercial, financial, or business considerations that are worked out among the entities in advance, and a particular technical solution to implement the guarantee on an end-to-end basis may be adapted in view of such considerations.

Continuing with the illustrative example shown in FIG. 7, the RAN slice controller 405 communicates with the WAN slice controller 410 over the interface 720 to extend the slicing construct for the privileged traffic from the RAN slice 710 to the WAN slice 715 which will meet applicable guarantees. The RAN slice controller may communicate desired properties, for which the WAN slice controller may agree to support, or for which one or more counter offers may be provided to thereby effectuate a negotiated agreement to instantiate an end-to-end slice. The RAN slice controller can place an ID 760 in a data packet header, or utilize some other suitable mechanism, to provide end-to-end data plane connectivity between the UE 200 and the application server 515. If the RAN and WAN slice controllers 405 and 410 are unable to negotiate terms for the session that meet the applicable guarantees within some suitable time window, then the RAN controller may, for example, wait and make a future request to the WAN slice controller, reject an admission request from the UE to join the 5G network, or default to some other level of service for the session.

The negotiation process in this example may be conducted on a session basis. However, different granularity may be utilized for a given instance of an end-to-end slice. The RAN and WAN slice controllers 405 and 410 may, for example, provision an end-to-end network slice 605 that is available to support multiple sessions among multiple UE and services over some dedicated time period. In some use cases, for example, an end-to-end network slice may be maintained indefinitely until the slice is discontinued and committed resources are released. In other use cases, end-to-end slices can be highly dynamic with fine granularity in which resources are allocated based on real-time demand and/or changing network state. Using SDN and virtualized network functions that can be readily allocated, the RAN and WAN slice controllers are enabled to meet customer and end user demands with optimal resource utilization across a broad range of use scenarios.

Figure 8:
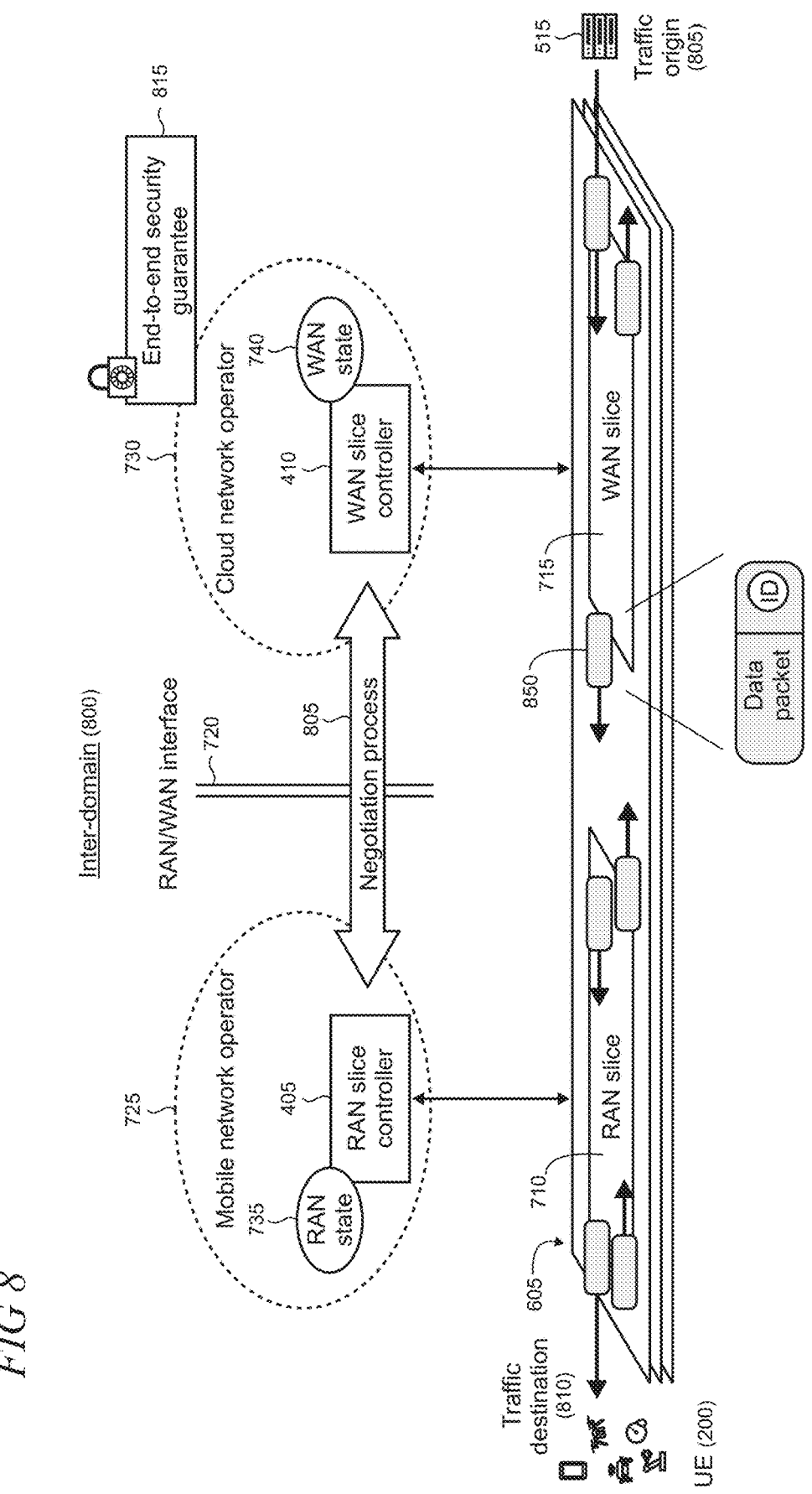

FIG. 8 shows an illustrative inter-domain arrangement 800 in which a RAN slice controller 405 and a WAN slice controller 410 engage in a negotiation process 805 for a communications session in which data packets (e.g., packet 850) are exchanged between a RAN slice 710 and a WAN slice 715 that form the end-to-end network slice 605. Here, the origin 805 of the traffic is at an application server 515 supported by a cloud network operator 730 and the destination 810 is a UE 200 that accesses the 5G network via a RAN supported by a mobile network operator 725. For example, originating traffic could comprise a push notification, an inbound email message to the UE, a text message, and the like. The cloud network operator may function as the provider of an end-to-end security guarantee 815 in this exemplary use case. However, as discussed above when referring to the arrangement 700 shown in FIG. 7, various entities or combinations of entities can provide the security guarantee and/or some other guaranteed service level or performance metric as required for a given application.

Figure 9:
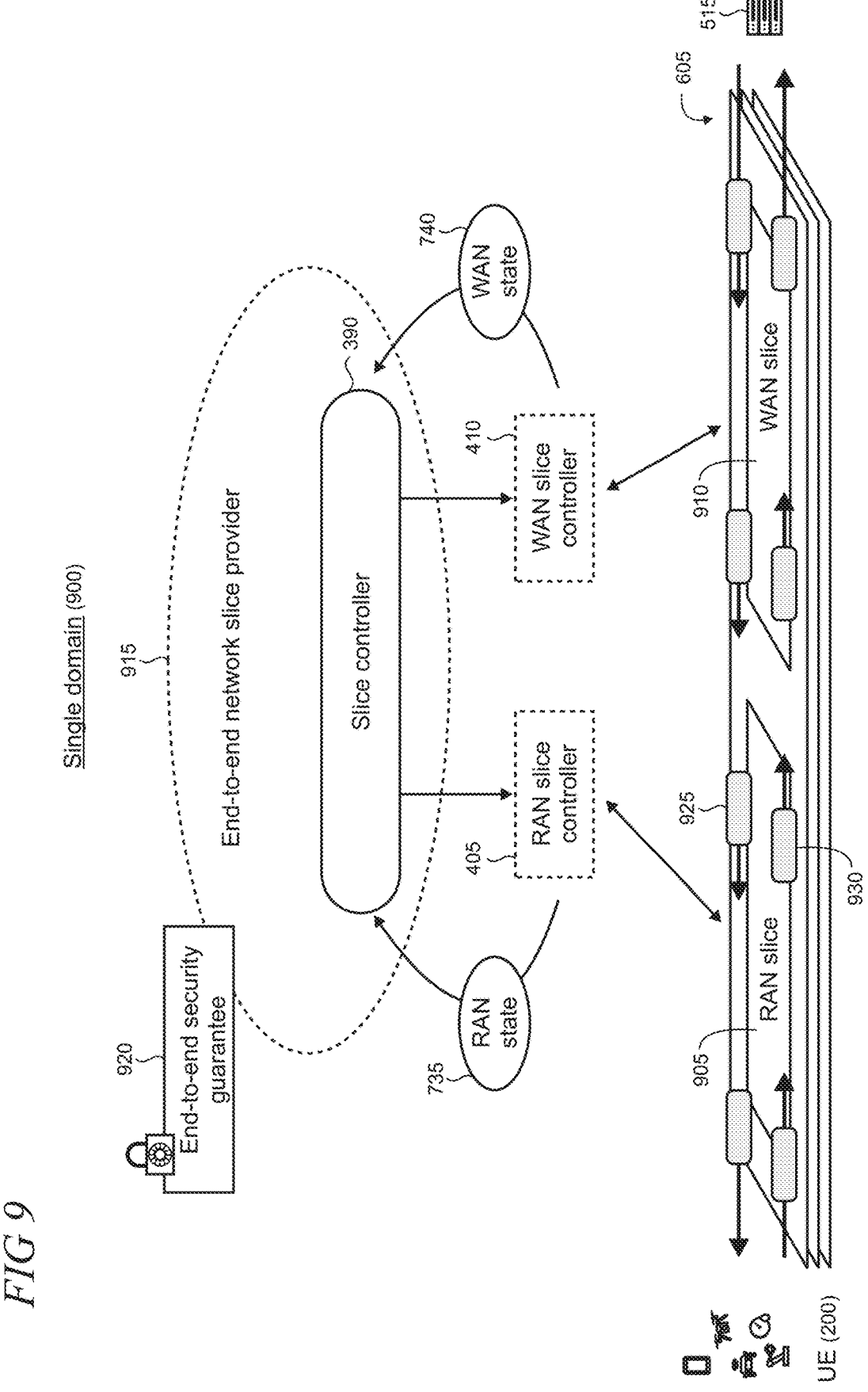
FIG. 9 shows an illustrative single domain arrangement in which a slice controller controls a RAN slice controller and a WAN slice controller to implement a communications session in which data packets are exchanged.

FIG. 9 shows an illustrative single domain arrangement 900 in which a slice controller 390 controls the RAN slice controller 405 and a WAN slice controller 410 to implement a communications session in which data packets are exchanged over an end-to-end network slice 605 comprising a RAN slice 905 and WAN slice 910. In some implementations, the slice controller 390 is adapted to directly incorporate functionality of the RAN and WAN slice controllers such that the single slice controller directly controls slicing of the RAN and WAN and maintains knowledge of the respective states of the RAN and WAN slices. In this case, the RAN and WAN slice controllers may not need to be implemented in the 5G network, as indicated by the dashed lines for elements 405 and 410 in the drawing.

The single domain is supported by an end-to-end slice provider 915 which may comprise, for example, a mobile network operator, cloud network operator, internet service provider, telecommunications carrier, enterprise operator, telecommunications service reseller, resale carrier, or the like, or any other entity that is arranged to obtain services from a carrier and present them to public end-users. In this use case, the end-to-end network slice provider supports services having an end-to-end security guarantee 920 or some other guaranteed service level or performance metric for traffic (e.g., packets 925, 930) that is carried bi-directionally among UE 200 and application servers, for example.

The slice controller 390 is configured with suitable interfaces (not shown) to receive RAN state 735 from the RAN slice controller 405 and WAN state 740 from the WAN slice controller 410. The slice controller can maintain knowledge of the state of the constituent slice components to dynamically provision and maintain the end-to-end slice 605 in view of changing traffic and network conditions. In implementations in which the RAN and WAN slice controllers are not individually instantiated, the slice controller can itself maintain state information for the RAN and WAN slices.

Figure 10:
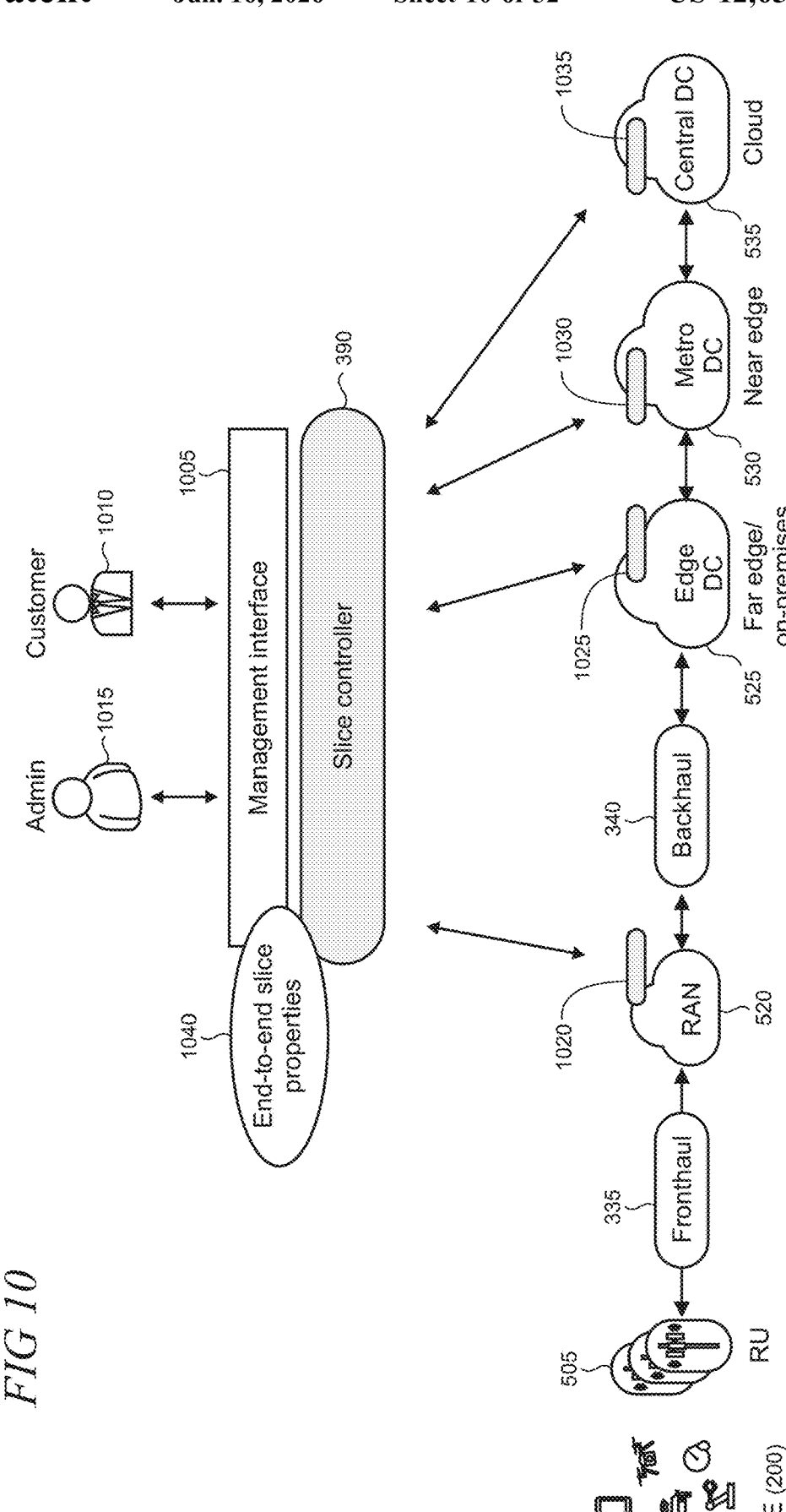
FIG. 10 shows a management interface that is exposed by a slice controller, in which the slice controller may comprise a centralized instance or distributed instances.
Figure 11:
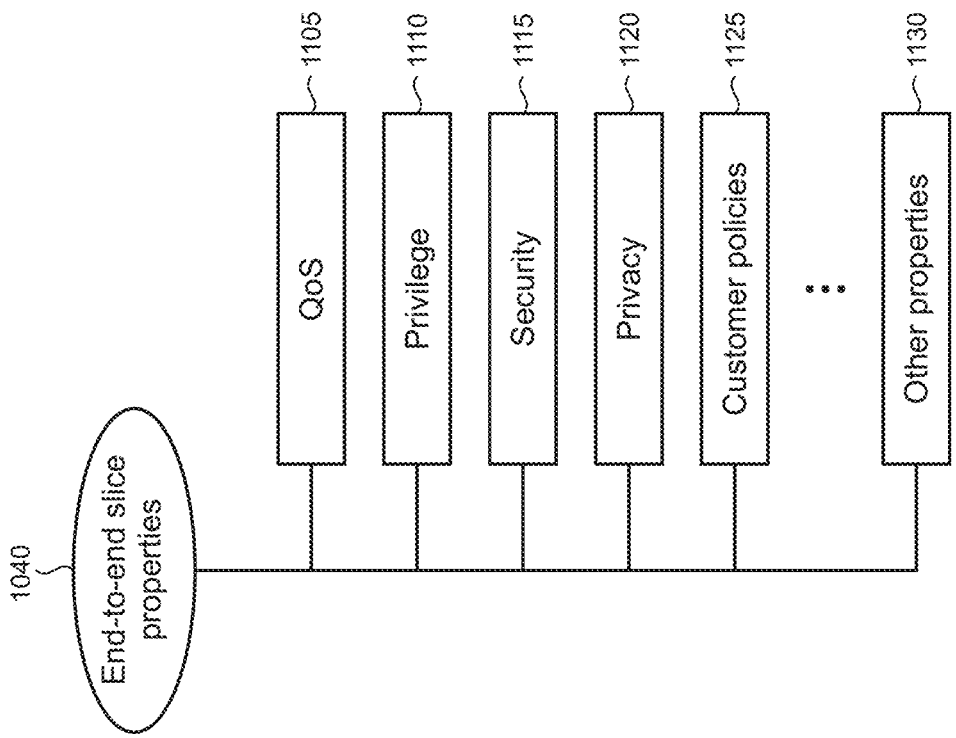
FIG. 11 shows illustrative end-to-end slice properties.

As shown in FIG. 10, the slice controller 390 can be implemented as a single instance configured for centralized communication and control of slicing across the underlying 5G infrastructure. In such cases, the abstraction functionality provided by the RAN/WAN interface 720 (FIG. 7) may be incorporated directly into the slice controller. The location and configuration of such centralized control element can vary by implementation and will typically depend on the type of entity that provides the end-to-end slicing (e.g., mobile network operator, cloud network provider, reseller, etc.). In alternative implementations, multiple instances (e.g., as indicated by reference numerals 1020, 1025, 1030, and 1035) of the slice controller can be operated in various ones of the RAN and DCs. In another alternative implementation, the functionality of the slice controller can be implemented using a distributed computing arrangement across various parts of the 5G infrastructure.

The slice controller 390 can be configured to expose a management interface 1005 to customers 1010 and/or administrators 1015. The management interface may be arranged to enable a user to select properties 1040 that may be applicable to a given end-to-end network slice. Exemplary user-selectable properties are shown in the taxonomy 1100 in FIG. 11. As shown, the properties may include one or more of QoS 1105, privilege 1110, security 1115, privacy 1120, customer policies 1125, or other properties that are suitable for a particular implementation of the present principles for end-to-end secure communications for privileged 5G network traffic. It may be appreciated that the user-selectable properties discussed herein are illustrative and not limiting and may overlap.

The QoS properties 1105 can typically comprise predefined technical characteristics for the end-to-end slice such as throughput, latency, reliability, etc. The privilege property 1110 may comprise an indication of priority or importance of certain data traffic, UE, and/or application types relative to others. For example, a given customer may offer differentiated services to its end-users where some service offerings are given priority over other services, for example, during cases when the network is congested. Privileges may be selected to give priority to real-time applications such as voice and live video while applications such as streaming video and internet browsing may be selected to have lower priority.

The security property 1115 may be selected by a user over the management interface 1005 (FIG. 10) to specify, for example, levels or types of security that may be implemented on an end-to-end slice. A customer or end-user may have heightened security requirements that may necessitate particular RAN or WAN configurations. For example, temporal sharing of RAN resources may be reduced or eliminated, or wavelength division multiplexing may be reduced or eliminated in the WAN. The privacy property 1120 may be selected by a user to specify, for example, levels or types of privacy that need to be accommodated on an end-to-end slice. For example, government or enterprise policies may limit some datatypes to particular geographic areas or network routes. Customer policies 1125 that govern an end-to-end slice configuration may also be specified by the user. For example, customer policies may impose per-client bandwidth limits, schedules, security and content filtering, and the like.

The slice controller 390 may operate to implement the user-specified end-to-end slice properties when provisioning a slice. The slice controller will attempt to map the user-specified properties to current properties of the constituent RAN and WAN slices. Such current properties of the RAN and WAN infrastructure may comprise operating as well as physical characteristics in some cases.

Figure 12:
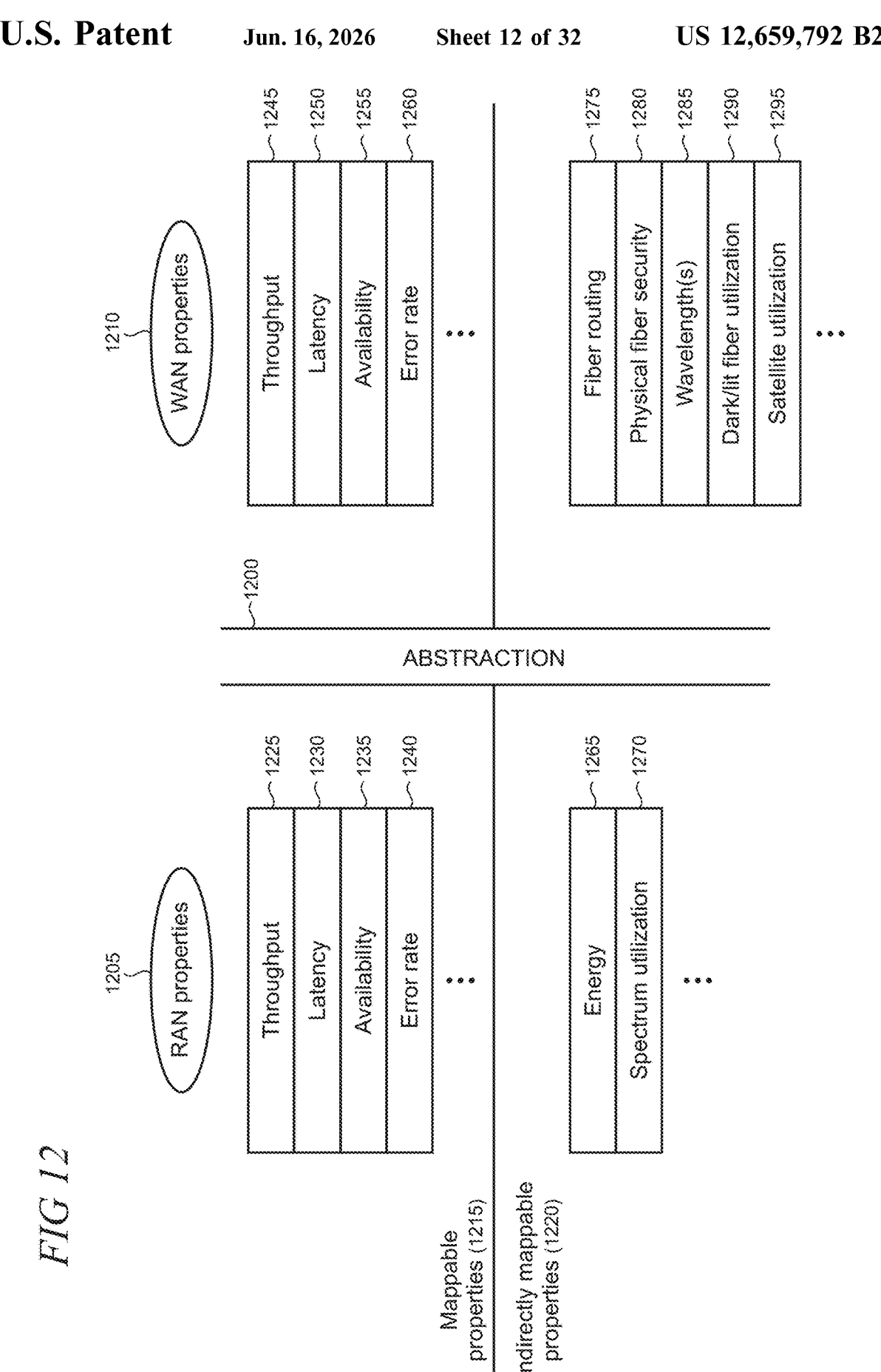
FIG. 12 shows illustrative RAN and WAN properties.

FIG. 12 shows illustrative RAN properties 1205 and WAN properties 1210. It may be appreciated that the RAN and WAN properties discussed herein are illustrative and not limiting and may overlap. As the slice controller stitches a RAN slice and a WAN slice together to create an end-to-end slice, the controller may be adapted to map properties across different infrastructure types and domains. While some properties may be more readily mapped between domains, as indicated by reference numeral 1215, it may be appreciated that some abstraction of the underlying physical infrastructure and its associated operating functions and parameters will typically need to be supported by the slice controller, as indicated by reference numeral 1200. The slice controller may perform the mapping so that desired user-specified properties and services can be provisioned on the created end-to-end slice.

The RAN properties include throughput 1225, latency 1230, availability 1235, and error rate 1240 which are mappable to the corresponding WAN properties as respectively indicated by reference numerals 1245, 1250, 1255, and 1260. Other properties are unique to each domain and are thus only indirectly mappable, as indicated by reference numeral 1220.

Properties that are unique to the RAN slice are generally related to RF characteristics of the air interface of the RAN and may include, for example, energy 1265 and spectrum utilization 1270. Properties that are unique to the WAN slice may include, for example, fiber routing 1275 and physical fiber security 1280. Fiber routing may be described by the particular routes traversed by optical fibers including terrestrial, undersea, and/or aerial routes. Physical fiber security may be described by the types of routing pathways utilized for optical fibers including, for example, ducts, conduits, any hardening techniques applied, and the extent to which multiple customers share optical fibers in a given pathway. Other unique WAN properties may include, for example, wavelength utilization 1285, dark/lit fiber utilization 1290, and satellite utilization 1295.

For indirectly mappable properties of the RAN and WAN, the slice controller 390 may apply suitable mapping rules and logic to enable an end-to-end construct to be implemented despite the dissimilarities between the RAN and WAN domains. For example, for the end-to-end security guarantee, a technique may be utilized in which the RAN is sliced only in the frequency domain, but not in the time domain (i.e., multiple tenants are never handled simultaneously in the same time interval) to increase isolation of customer traffic carried on the RAN slice. To extend the heightened security to the WAN slice to implement the security guarantee end-to-end, a discrete wavelength may be dedicated to the customer traffic, for example, to provide equivalent isolation to the frequency domain-only slicing the RAN slice. In another example, a particular fiber routing path for the WAN may be utilized to avoid shared conduits. It may be appreciated that other combinations of techniques may also be utilized to implement the end-to-end guarantees for a variety of service levels and metrics over an end-to-end slice that spans disparate domains.

Figure 13:
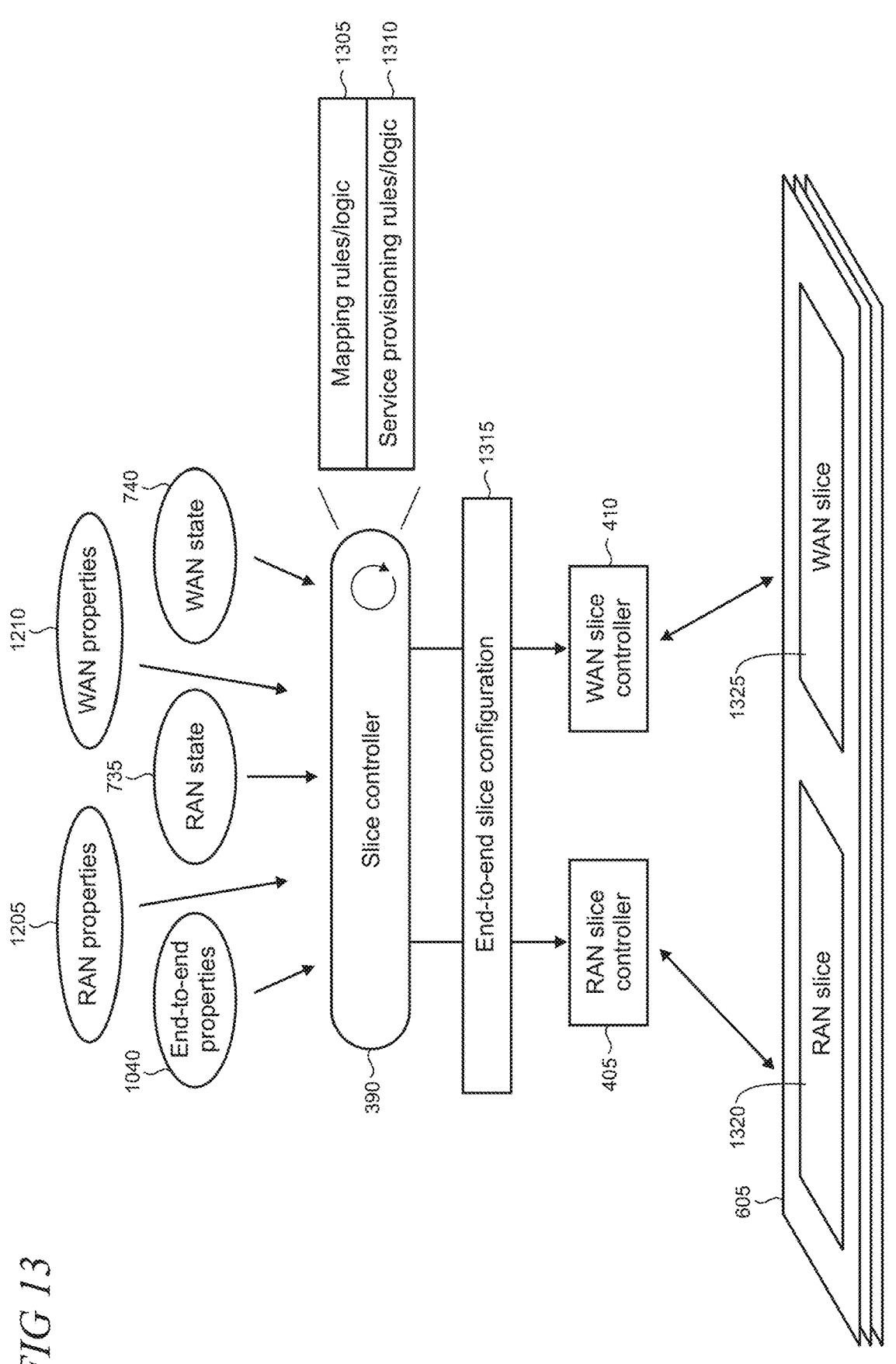
FIG. 13 shows an illustrative slice controller dynamically implementing cross-domain property mapping and resource allocation to provision services on an end-to-end slice.

FIG. 13 shows the slice controller 390 dynamically implementing cross-domain property mapping and resource allocation to provision services in an end-to-end slice. Such provisioned services can include end-to-end guarantees for security for privileged and other traffic and/or guarantees for other service levels or technical characteristics or metrics. The slice controller can take various data sets as inputs including user-selected end-to-end slice properties 1040, RAN properties 1205, WAN properties 1210, RAN state 735, and WAN state 740. The slice controller may apply mapping rules and logic 1305 and service provisioning rules and logic 1310 to generate an end-to-end slice configuration 1315 that is provided to RAN slice controller 405 and WAN slice controller 410 to implement and create an instance of an end-to-end slice 605 from the constituent RAN slice 1320 and WAN slice 1325.

The slice controller 390 operates dynamically in typical use scenarios to allocate and reallocate resources as needed to implement different end-to-end slice configurations 1315 to maintain the end-to-end guarantee as conditions in the network change. For example, RAN state 735 and WAN state 740 can change as traffic conditions change and the network becomes congested. In other scenarios, RAN and WAN states can change as a result of changes in environmental and/or external conditions such as weather causing RF interference in the RAN slice or a cable cut occurring in the WAN slice.

FIG. 14 is a flowchart of an illustrative method 1400 that may be performed to provide an end-to-end slice of a 5G network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1405, a user interface is exposed to enable a user to select properties that are applicable to the end-to-end 5G network slice. At block 1410, a RAN slice controller is implemented that is operatively coupled to physical infrastructure underlying the RAN including a radio frequency (RF) air interface to user equipment (UE) provided by a radio unit (RU).

At block 1415, a WAN slice controller is implemented that is operatively coupled to physical infrastructure underlying the WAN including one or more long-haul optical systems. At block 1420, the RAN and WAN slice controllers are interoperated over an interface to instantiate a 5G network slice that includes a slice of the RAN and a slice of the WAN and in which the selected properties are provisioned across the instantiated 5G network slice from end to end.

FIG. 15 is a flowchart of an illustrative method 1500 that may be performed by a computing device operable on a 5G network. At block 1505, a WAN slice is created comprising a selected subset of nodes of a WAN that is utilized as a portion of a transport network of a 5G network to provide point-to-point transport of 5G network traffic from an entry node to a destination node in an optical domain described by a selected wavelength that is contiguously utilized across the subset of nodes, in which the WAN slice includes at least one intermediate node between the entry node and the destination node. At block 1510, a RAN slice is created comprising a selected subset of physical radio resources that are applicable to an air interface of the RAN slice.

At block 1515, the created RAN slice and WAN slice are stitched together into an end-to-end 5G network slice from the air interface to the destination node over which privileged traffic is carried. At block 1520, a security property is extended across the end-to-end 5G network slice to the privileged traffic.

FIG. 16 is a flowchart of an illustrative method 1600 that may be performed by a computing device operable on a 5G network. At block 1605, a slice controller is instantiated on the computing device, in which the slice controller is configured to create a 5G network slice from RF and optical portions of the 5G network. At block 1610, a user interface to the instantiated slice controller is exposed that is configured to enable a user to select a property that is applicable to the created 5G network slice.

At block 1615, the slice controller is dynamically operated to control slicing of a wide area network (WAN) that provides transport network functionality for the 5G network, in which the WAN slicing comprises provisioning nodes of the WAN to utilize a selected wavelength to carry 5G network traffic in a WAN slice from an entry node, through zero or more intermediate nodes, to a destination node. At block 1620, the slice controller is dynamically operated to control slicing of a RAN by allocating physical resources to a RAN slice for an air interface of the RAN, in which the air interface provides access from UE to the RAN. At block 1625, a user-selected property is provisioned on the created 5G network slice comprising the RAN slice and WAN slice.

Figure 17:
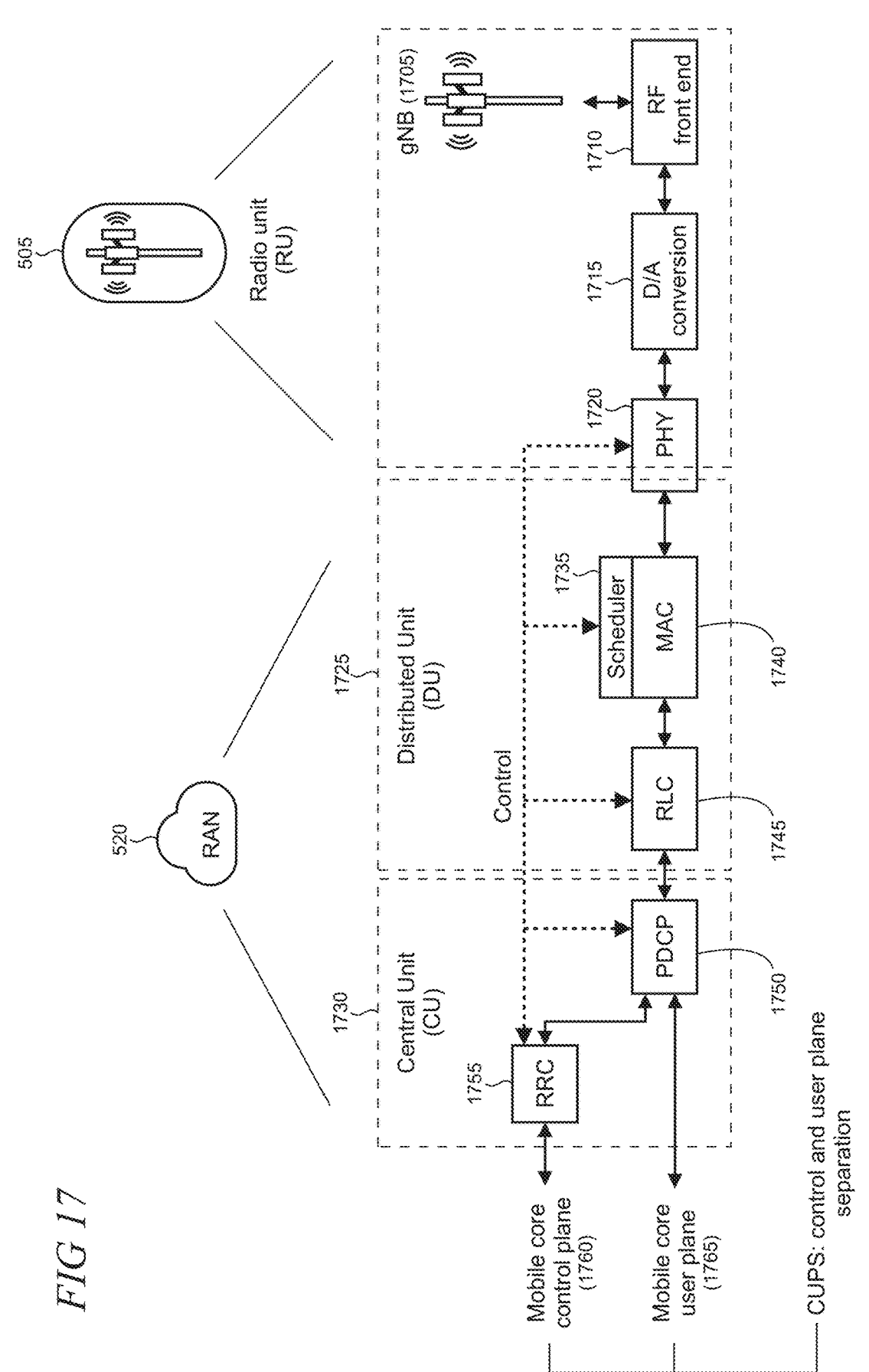
FIG. 17 shows an illustrative 5G RAN and radio unit (RU)

A discussion of the RAN portion of a 5G network is next presented. FIG. 17 shows functional blocks of the RAN 520 and RU 505. The RU comprises radio transmission points, for example, a next generation Node B, gNB 1705, which handles radio communications with the UE. The gNB is serially coupled to a radio frequency (RF) front end 1710, a digital to analog (D/A) conversion unit 1715, and a portion of the functionality of the physical (PHY) layer 1720 as described in the OSI Open Systems Interconnection model.

Under 3GPP and O-RAN (Open RAN) Alliance, the processing pipeline of the RAN 520 is split into a distributed unit (DU) 1725, and a central unit (CU) 1730. The DU is responsible for real-time layers 1 and 2 (L1 and L2) scheduling functions, and the CU is responsible for non-real-time, higher L2 and L3 functions. Accordingly, the DU comprises a scheduler 1735 located on top of a MAC (Medium Access Control) layer component 1740, an RLC (radio link control) layer component 1745, and parts of a PHY (physical) layer component 1720. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 1730 is configured with a PDCP (Packet Data Convergence Protocol) layer component 1750 and RRC (Radio Resource Control) layer component 1755. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 1760 while the PDCP layer component interfaces with the user plane 1765 to thereby implement the "CUPS" feature of 5G (control and user plane separation).

A split-RAN configuration enables RAN functionality to be split among physical infrastructure elements in centralized and distributed locations. For example, a single CU 1730 may be configured to serve multiple DUs 1725, each of which in turn serves multiple RUs 505.

Figure 18:
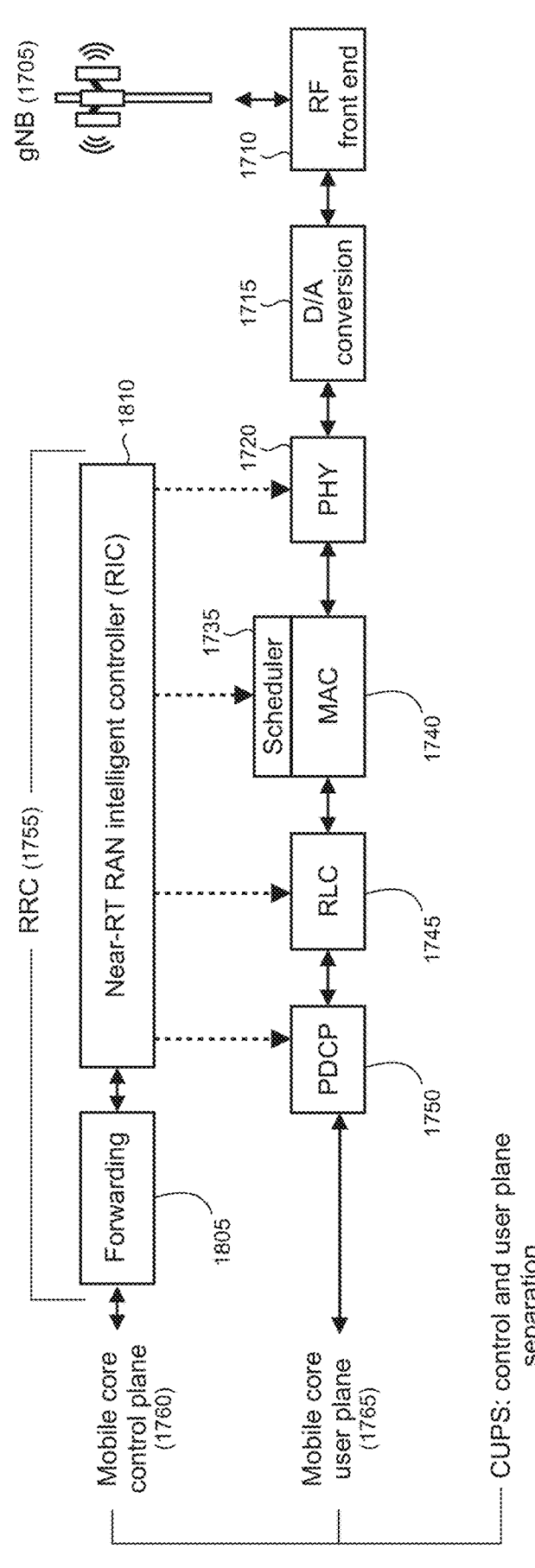
FIG. 18 shows an illustrative radio resource control (RRC) that is disaggregated into a mobile core-facing control plane component and a near-real-time RAN intelligent controller (near-RT RIC)

FIG. 18 shows that the RRC layer component 1755 may be disaggregated into a mobile core-facing control plane forwarding component 1805 and a near-real-time (RT) RAN intelligent controller (RIC) 1810. The RRC layer component is thus responsible for only near-real-time configuration and control decision making, while the scheduler 1735 on the MAC component 1740 is responsible for real-time scheduling decisions.

The scheduling may be performed to create RAN slices by allocating logical representations of physical radio resources in the PHY component 1720 associated with an air interface between UE 200 (FIG. 5) and RU 505. The MAC component 1740 may perform RAN slice resource allocation through interactions, for example, with the RAN slice controller 405 (FIG. 4). More specifically, a physical radio resource is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented using dimensions comprising frequency (e.g., subcarriers) and time (e.g., time slots). In 5G, slots support frame structures of the radio resources in the time domain which are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each subframe. It may be appreciated that spatial multiplexing, referred to as MIMO (multiple input, multiple output), may also be utilized to provide additional layers of RAN resources that the slice controller may allocate in some implementations.

Figure 19:
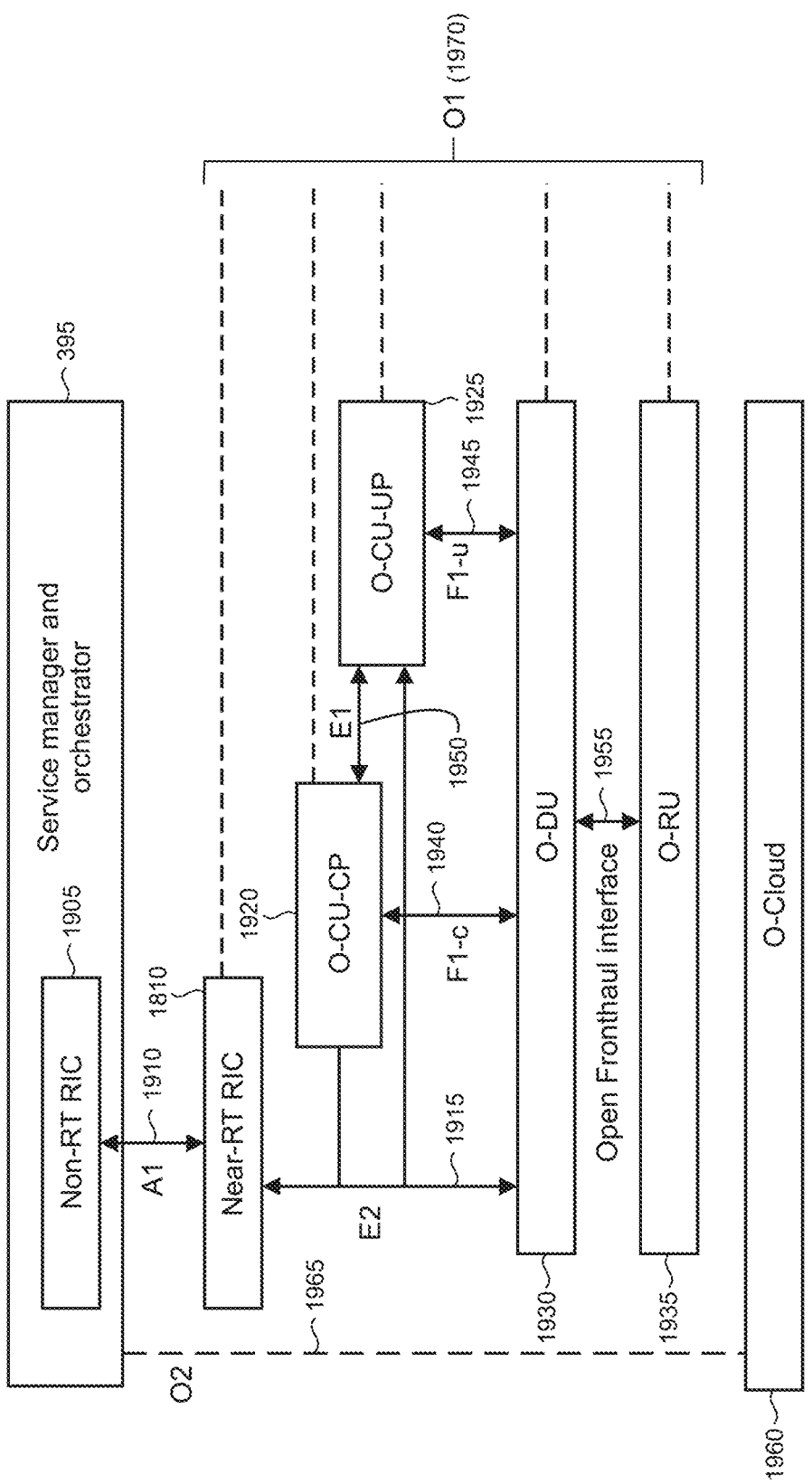
FIG. 19 shows an illustrative RAN operations and maintenance (OAM) logical architecture as described by the O-RAN (Open Radio Access Network) Alliance.

FIG. 19 shows an illustrative RAN operations and maintenance (OAM) logical architecture 1900, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 1905 may be incorporated into the service manager and orchestrator 395. The non-RT RIC interoperates with a near-RT RIC 1810 through an A1 interface 1910.

The near-RT RIC 1810 is coupled over an E2 interface 1915 with network functions for radio access for control and optimization including the O-CU-CP (O-RAN Central Unit-Control Plane) 1920, O-CU-UP (O-RAN Central Unit-User Plane) 1925, and O-DU 1930. The O-CU-CP and O-CU-UP are respectively coupled to the O-DU over F1-c and F1-u interfaces, 1940 and 1945, as defined and maintained by 3GPP. The O-CU-CP is coupled to the O-CU-UP over a 3GPP E1 interface 1950. The O-DU and O-RU 1935 are coupled using an Open Fronthaul interface 1955 (also known as the lower layer split (LLS) interface).

The O-Cloud 1960 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 1965. An O1 interface 1970 is provided to each of the near-RT RIC, O-CU-CP, O-CU-UP, O-DU, and O-RU, as shown in FIG. 19.

Figure 20:
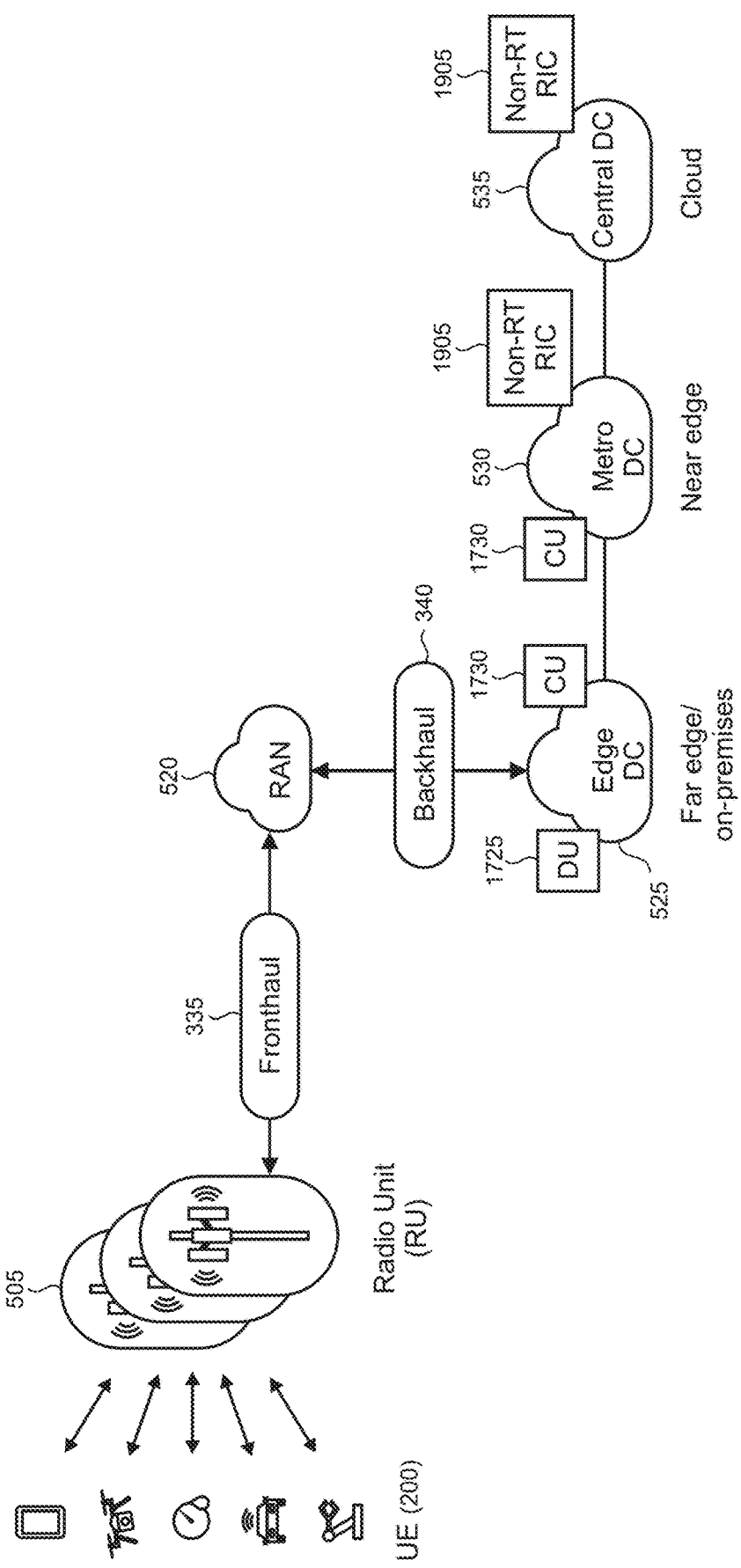
FIG. 20 shows an illustrative 5G implementation in which split-RAN functional units and instances of the non-real-time RIC (non-RT RIC) may be distributed among physical infrastructure components.

The splitting of functional elements among the DU, CU, near-RT RIC, and non-RT RIC, as discussed above, enables flexible deployment of instances of such elements in the physical infrastructure that underlies a typical 5G network. FIG. 20 shows an illustrative implementation in which split-RAN functional units and instances of the non-RT RIC may be distributed among physical infrastructure components of a 5G network 500. For example, as shown, a DU 1725 and CU 1730 may be located at the edge DC 525. A CU 1730 and non-RT RIC 1905 may be located in the metro DC 530. The central DC 535 can also host a non-RT RIC in some cases. In some implementations, the RAN slice controller 405 (FIG. 4) may be instantiated, for example, as a component of the near-RT RIC 1810 to thereby implement or combine the functionality of the scheduler 1735 (FIG. 17).

Figure 21:
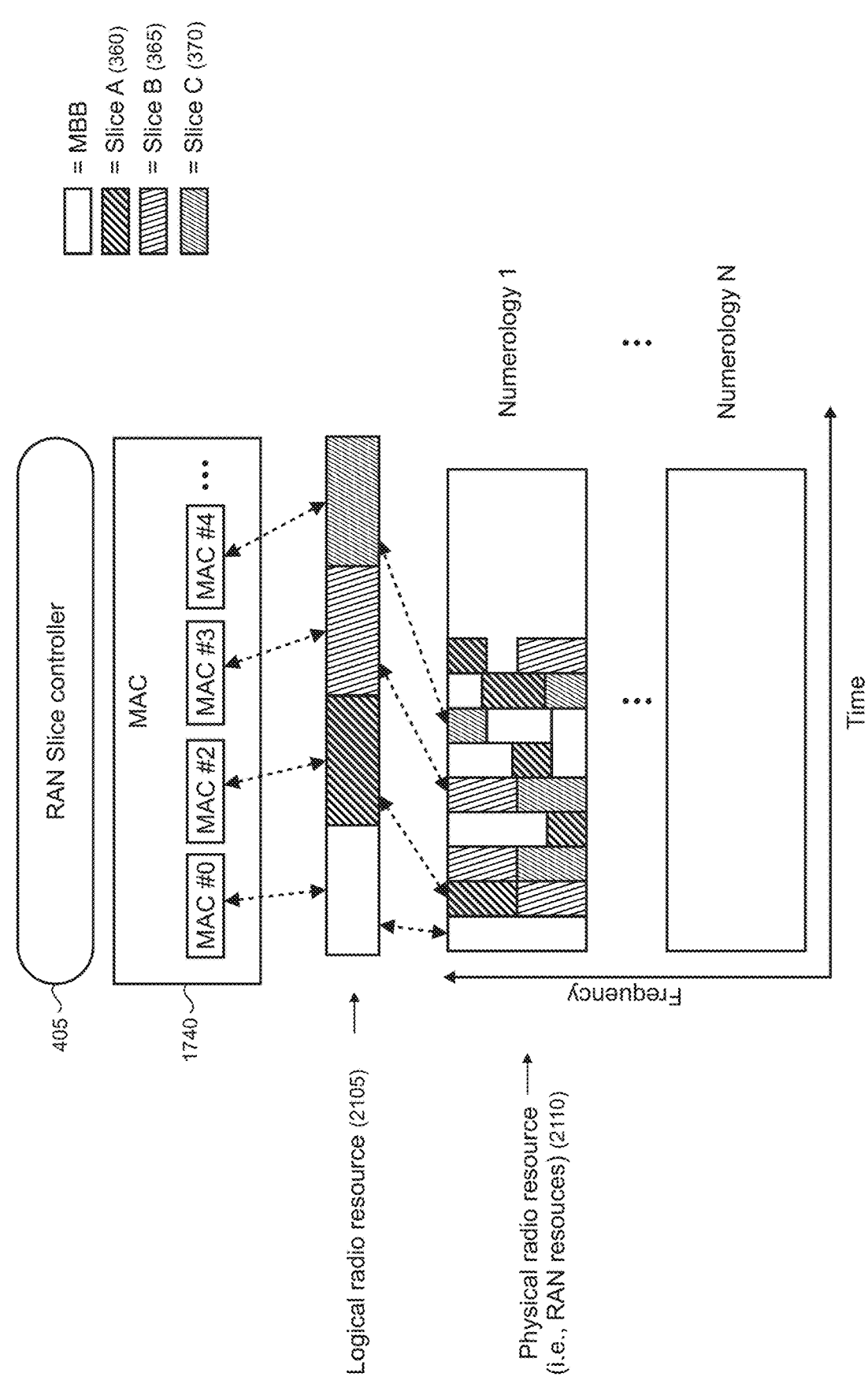
FIG. 21 shows an illustrative slice controller that may be configured to allocate physical radio resources among RAN slices.

FIG. 21 shows the RAN slice controller 405 as illustratively configured to allocate physical radio resources among network slices. The slice controller may be instantiated, for example, as a component of the near-RT RIC 1810 (FIG. 18) to thereby implement or combine the functionality of the scheduler 1735. In alternative implementations, part of the RAN slice controller may be distributed outside the near-RT RIC, for example, in a CU in an edge or metro DC, or included in one or more other functional elements of the 5G network architecture. In some implementations, dynamically optimized RAN actions to ensure SLA guarantees may be performed in the near-RT RIC while longer term SLA assurance can be handled in the non-RT RIC.

The RAN slice controller 405 is arranged to control operations of the MAC component 1740 based on logical representations 2105 of a radio resource in the PHY component 1720 (FIG. 17). As shown, the MAC component 1740 performs intra-slice resource allocation. More specifically, the physical radio resource 2110 is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented, as shown in FIG. 21, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each sub-frame. It may be appreciated that spatial multiplexing, referred to as MIMO (multiple input, multiple output), may also be utilized to provide additional layers of RAN resources that the slice controller may allocate in some implementations.

Figure 22:
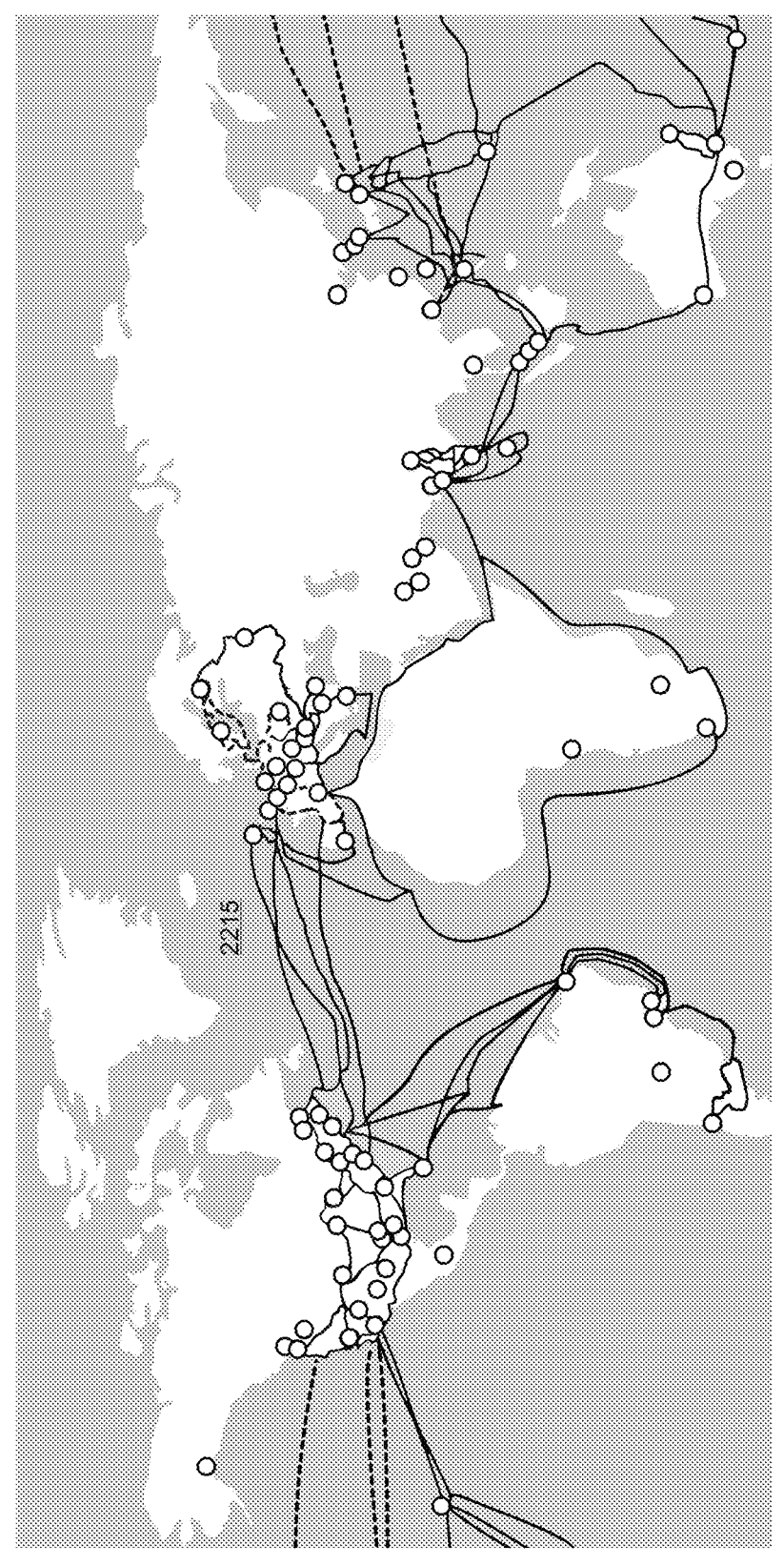
FIG. 22 is an illustrative map of data centers (DCs) comprising a wide area network (WAN) on a global basis.

A discussion of the WAN portion of a 5G network is next presented. WANs can be operated on a local, regional, and/or global basis. FIG. 22 is an illustrative map 2200 of data centers (DCs) 2205 and long-haul optical systems 2210 that comprise a global WAN 2215. Within metropolitan areas and across the WAN, a WAN provider typically must offer extremely high bandwidths with near-perfect service availability and appropriate latencies to meet customer demands for diverse types of data including, for example, enterprise cloud applications and email, VoIP (voice over internet protocol), streaming video, IoT, search, and cloud storage. Accordingly, DCs are distributed through a given WAN topology and interconnected with optical transport systems such as long-haul optical systems. Such WAN configurations may support an application space which may be called "data center interconnect" (DCI).

Within a given geographic region, separation between DCs 2205 must be far enough to avoid multiple site failures during catastrophic events, but the physical network connecting them cannot exceed the round-trip latency requirements of the application layer, typically less than a few milliseconds. All distributed DCs in the regional network are connected to each other over numerous diverse point-to-point DCI systems, carrying hundreds of 100G inter-switch links on each, allowing the region to operate effectively as one mega data center with petabits per second of low-latency inter-DC capacity. Between regions, where fiber resources are more constrained by an order of magnitude or more, the criteria for optimization are different: traffic is less latency-sensitive, distances are much greater, and spectral efficiency becomes critical.

In some cases, the optical transport systems can be OLS-based (open line system) with optical sources residing directly on routers to provide systems that are optimized for point-to-point inter-region connectivity capable of transporting optical signals over long distances with maximal optical signal-to-noise ratio (OSNR) and spectral efficiency. By decoupling the optical sources from the line system, the WAN provider can typically control the end-to-end link budgeting and SLAs for the deployed infrastructure and can accordingly operate it with tighter margins. To provide high-availability, high-performance services to customers, the WAN will typically be configured to have compute and storage presence as close to the customers as economics allow.

Figure 23:
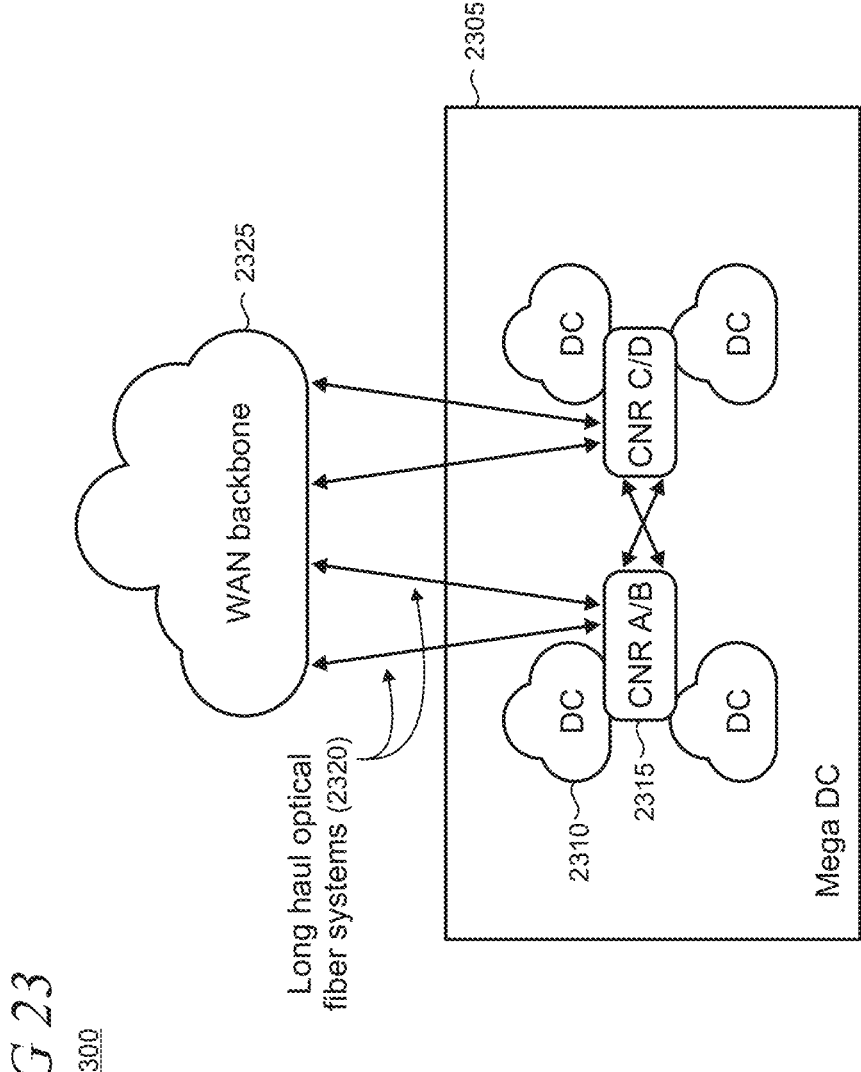
FIG. 23 shows an illustrative example of a mega-DC architecture.

FIG. 23 shows an illustrative example of a mega-DC architecture 2300 which may be utilized to establish a regional presence in which large singular campus facilities are utilized. The mega-DC campus 2305 may comprise multiple DCs 2310 that are interconnected with standardized (i.e., "gray") optics and/or bulk fiber through core network rooms (CNRs) 2315 designated by letters A, B, C, and D. The CNRs are coupled via long haul optical fiber systems 2320 to a WAN backbone 2325. The configuration of the optical fiber systems can vary. A typical system may support, for example 16 fiber-pairs with 40-80 wavelengths. Thus, such campus-based regions can generally provide capacity to support a given geography with local, low-latency resources that may be scaled up to the size of a mega-DC.

Figure 24:
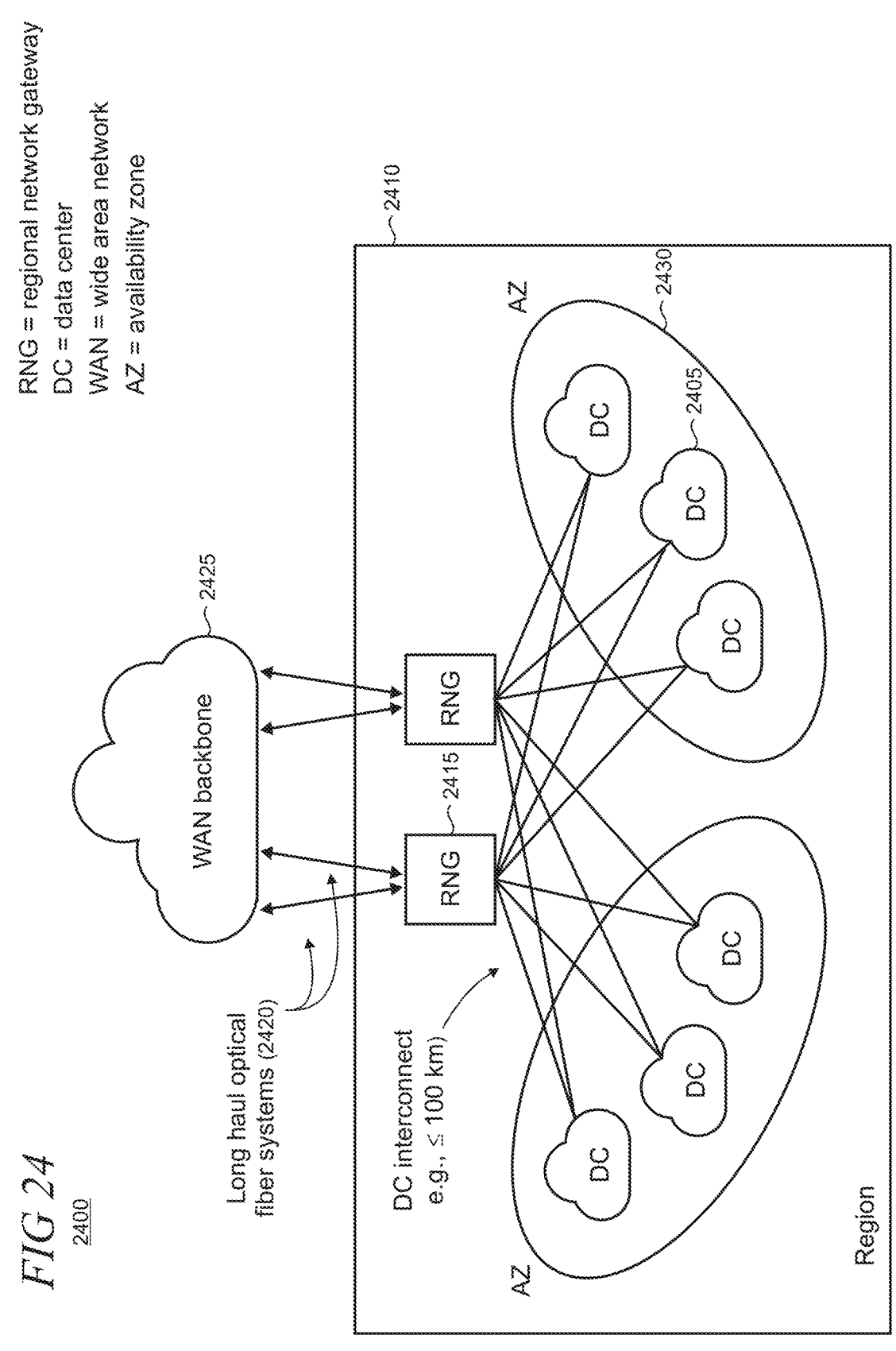
FIG. 24 shows an illustrative example of a regional DC architecture.

FIG. 24 shows an illustrative example of a regional DC architecture 2400 that may facilitate the distribution of DCs 2405 throughout a wider geographic area within a region 2410. Multiple campuses may be utilized to effectively extend the logical topology that is typically observed inside a DC (referred to as a data center Clos fabric) across a metropolitan area. In an illustrative example, diverse facilities are designated as regional network gateways (RNGs) 2415. DCs are redundantly connected back to each of the RNGs to ensure that the server-to-server latency remains sufficiently low to meet application layer requirements. For example, the architecture may utilize an interconnect configuration in which no single DC to RNG path exceeds 100 km. The RNG are coupled via long haul optical fiber systems 2420 to a WAN backbone 2425. The geographical diversity of the individual DCs gives rise to availability zones (AZs) 2430 which provide regional resiliency under catastrophic failure conditions within a given DC site.

To implement the present end-to-end secure communications for privileged 5G network traffic, the WAN slice controller 410 (FIG. 4) may be configured to select particular nodes of a WAN to form a WAN slice. A given WAN slice may typically be configured as a collection of nodes in which each node provides a point of data ingress or egress in the WAN. The collection of nodes comprises a slice path that defines a given WAN slice that provides dedicated capacity for point-to-point data transport. A node can be located in a DC, but nodes are not necessarily limited to exclusively DC co-location.

Figure 25:
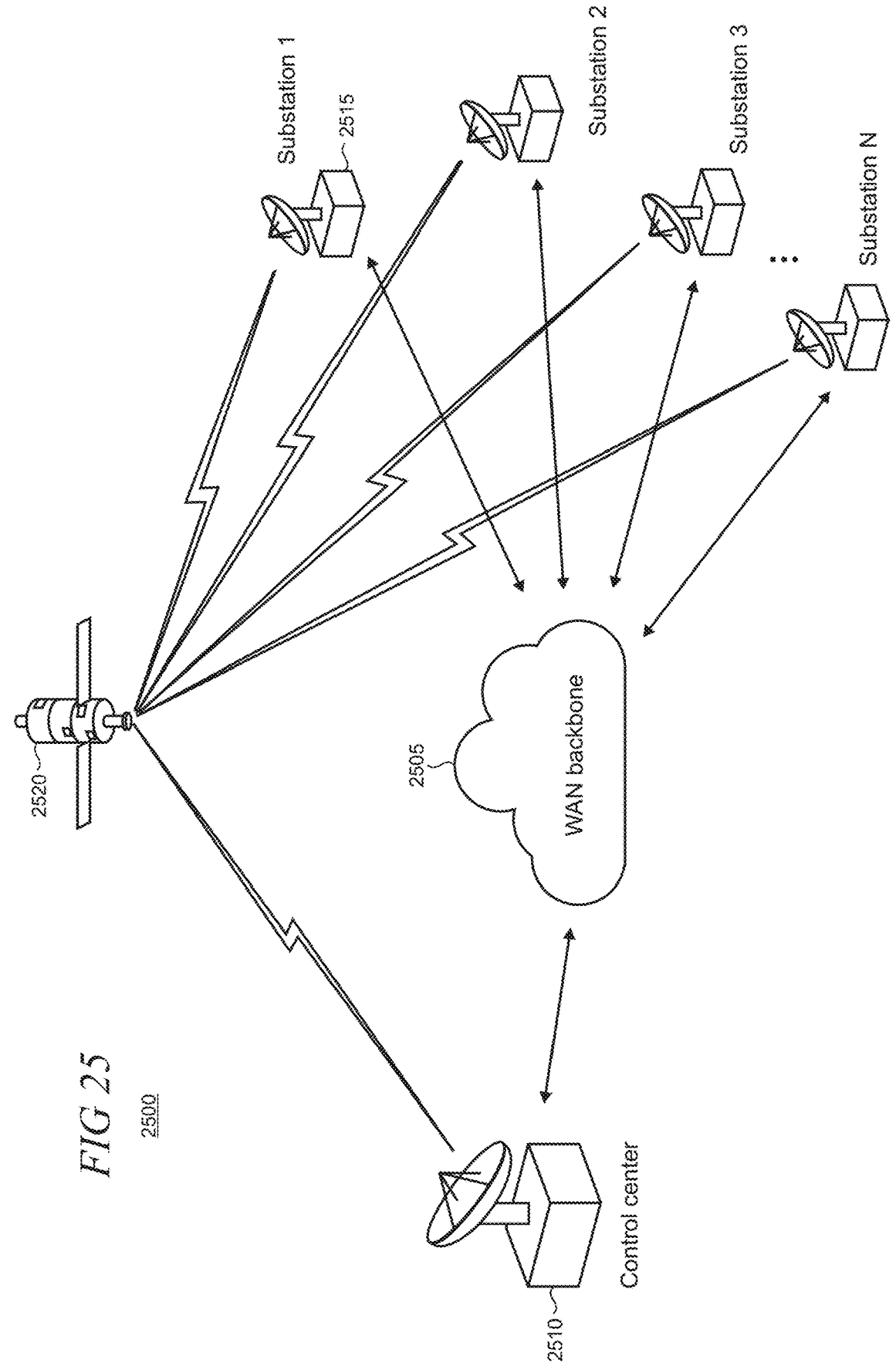
FIG. 25 shows an illustrative example of a hybrid WAN backbone.

FIG. 25 shows an illustrative example of a hybrid WAN backbone 2500. As a hybrid system, a mix of optical fiber systems (both undersea and terrestrial) and satellite links is utilized to provide broadband communications connectivity over a large geographic area. The hybrid WAN backbone comprises a WAN backbone 2505 that is supplemented with satellite infrastructure comprising a control center 2510 and one or more substations (representatively indicated by reference numeral 2515). The control center and substations can wirelessly communicate with one or more satellites 2520 in geosynchronous orbit. The control center and substations are coupled to the WAN backbone using conventional protocols such as TCP/IP.

Satellite links can provide connectivity for several typical use cases including providing backhaul connection between a RAN and WAN or by acting as a direct link to UE. In this latter case, the satellite essentially functions as a gNB. Slicing can be applied to both satellite use cases in accordance with the present principles. However, due to relatively high latency and bandwidth limitations, it may be expected that satellite links in typical applications will be utilized as a backup for optical cable systems in the WAN, in case of faults, rather than serve as a primary route for 5G network access.

A WAN may be logically sliced using shared physical infrastructure in accordance with the slicing principles described by 3GPP. An illustrative example of an alternative WAN slicing embodiment is presented in the discussion that follows in which the WAN is sliced on a wavelength basis. However, it is emphasized that the present principles of end-to-end secure communications for privileged 5G network traffic may be applied to any suitable WAN and/or RAN slicing constructs as may be necessary to meet particular requirements of a given application.

Figure 26:
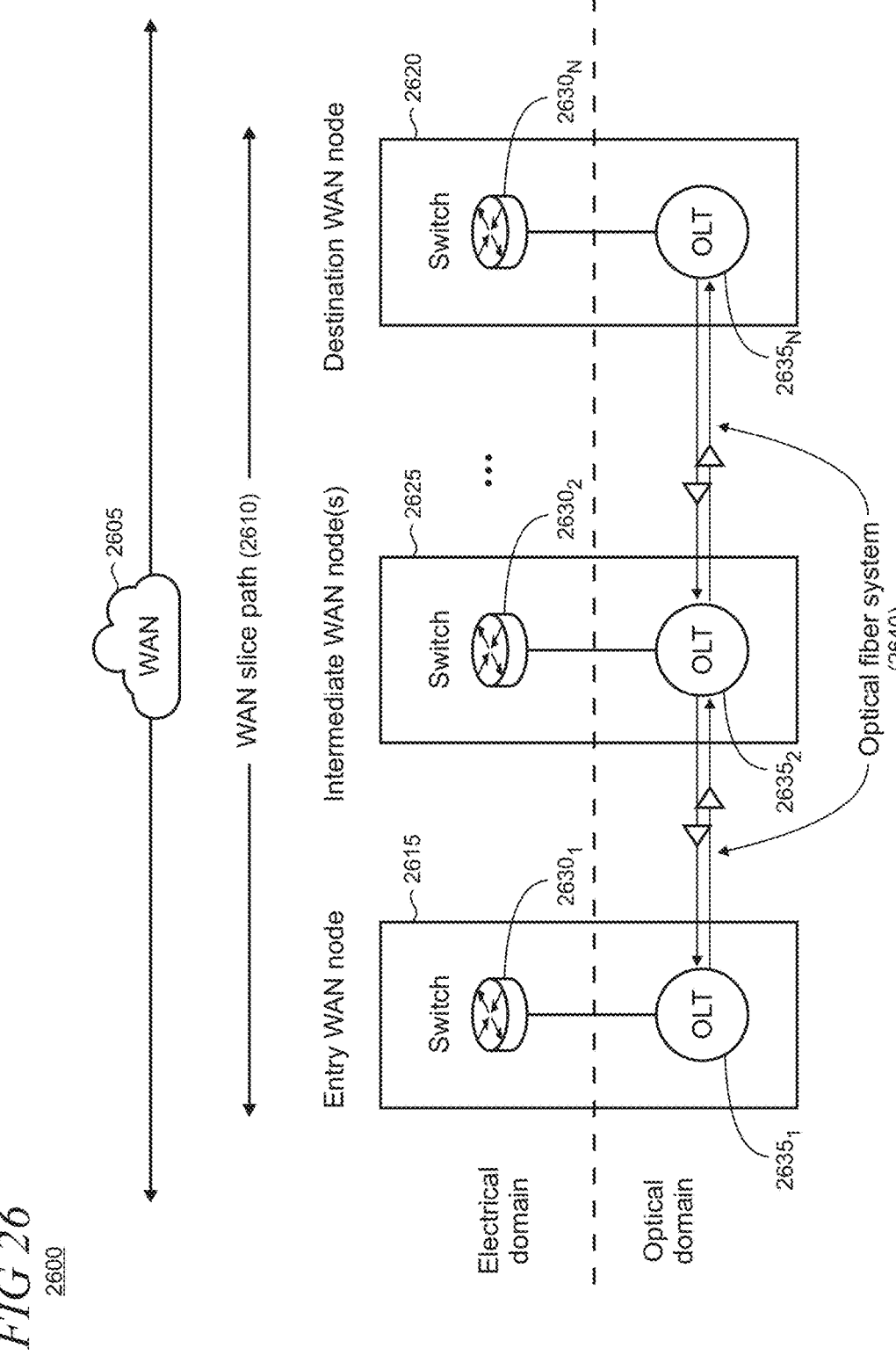
FIG. 26 shows an illustrative subset of WAN nodes that form a WAN slice path comprising an entry WAN node, a destination WAN node, and zero or more intermediate WAN nodes.

FIG. 26 shows an illustrative subset 2600 of nodes in a WAN 2605 that form a WAN slice path 2610 comprising an entry WAN node 2615, a destination WAN node 2620, and zero or more intermediate WAN nodes, representatively indicated by reference numeral 2625. It will be appreciated that the entry and destination nodes are selected to meet the particular geographic requirements of a given customer. The intermediate WAN nodes may be selected by the WAN slice controller 410 (FIG. 4) or some other network component using a suitable methodology to identify an optimal path that minimizes slice path length and/or the number of intermediate nodes traversed while ensuring that sufficient data capacity and resilience are provided. In general, the WAN slice path is selected, and the nodes are configured by the WAN slice controller, to enable traffic to be carried by components in optical line terminals (OLTs) 2635 and optical fiber system 2640 to thereby maintain strong WAN slice isolation. The data traffic thus remains in the optical domain, where possible, to avoid costly regeneration and re-provisioning in a switch 2630 in the electrical domain.

Figure 27:
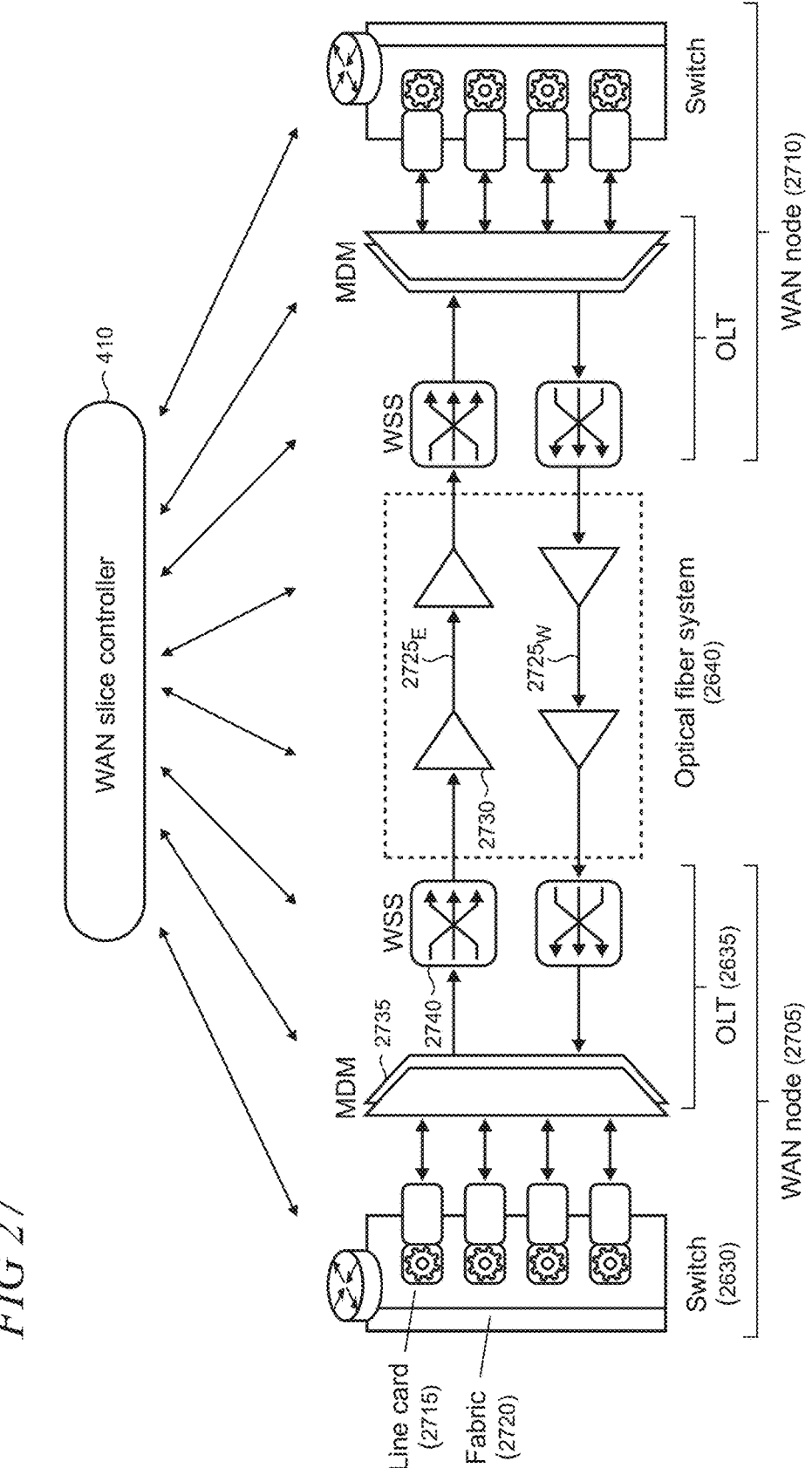
FIG. 27 shows details of illustrative network elements that may be utilized in a WAN node.

FIG. 27 shows details of illustrative network elements that may be utilized in each of two adjacent WAN nodes 2705 and 2710 in a WAN slice path (not shown). Each WAN node includes a switch 2630 comprising a plurality of line cards 2715 that interoperate through a fabric 2720 in the electrical domain. The line cards can comprise bandwidth-variable transceivers that function as DWDM (dense wavelength division multiplexing) optical sources. Such sources can comprise, for example, router-based integrated coherent optics (ICO) or other suitable equipment that may be configured to support multiple modulation formats and bit rates (e.g., 100-200 Gb, in 25 Gb increments) to suit characteristics of the optical fiber system 2640 defined, for example, by OSNR. The optical sources may support, for example, quadrature phase shift keying (QPSK), 8-ary quadrature-amplitude modulation (8QAM), and 16QAM modes at 100, 150, and 200 Gb/s payload rates, respectively. The optical fiber system 2640 may typically comprise multiple optical fiber-pairs 2725 and optical amplifiers 2730 such as erbium-doped fiber amplifiers (EDFAs) and/or Raman amplifiers.

The switch 2630 interfaces with the OLT 2635 that is configured to operate in the optical domain. The OLT includes an MDM (multiplexing/demultiplexing) optics 2735 and a WSS (wavelength selective switch) 2740 and may include optical amplifiers (not shown). The WSS may comprise, for example, one or more instances of a ROADM (reconfigurable optical add/drop multiplexer) that may operate as an optical switching engine. The WAN slice controller 410 may be configured to interoperate with some or all of the network elements in the WAN nodes and optical fiber system to provide the present end-to-end secure communications for privileged 5G network traffic.

FIG. 28 shows illustrative input functions 2805 that the WAN slice controller 410 may perform to obtain input data and information that is considered for WAN slicing. FIG. 28 also shows illustrative WAN slicing functions 2810 that the WAN slice controller may perform to provision, adapt, and manage WAN slices and the overall WAN infrastructure in some cases. The inputs and slicing functions are illustrative and not limiting and other inputs and slicing functions may be utilized to meet the needs of a particular implementation of the present end-to-end principles. Not all of the input or slicing functions are required to be performed in every implementation of the present end-to-end secure communications for privileged 5G network traffic. It is also emphasized that the input and slicing functions shown have no particular order of operation and therefore FIG. 28 should not be viewed as a flowchart.

The WAN slice controller 410 may perform input function 2815 to receive specifications and/or SLAs that may be applicable to a given customer. In some implementations, the specifications and SLAs can refer to characteristics of a given WAN slice. In alternative implementations, the specifications and SLAs can refer to characteristics of an end-to-end slice. Such specifications and SLAs can define slice requirements, including, for example, but not limited, to slice geography, capacity and throughput, availability, reliability, latency, and other performance, technical, and/or commercial requirements. In cases for which end-to-end slicing requirements are applicable, the WAN slice controller can be adapted for interoperation with other suitable SDN slicing management functions such as the RAN slice controller 405 and core slice controller 415 shown in FIG. 4 and described in the accompanying text.

The WAN slice controller 410 may perform input function 2820, monitoring the state of WAN nodes, to collect information and metrics from the network elements about the current network conditions, connectivity, and user plane and control plane data flow among the elements and WAN nodes. Typical metrics used to express network state include, for example, latency, packet loss indicators, jitter, bandwidth, and throughput, among other suitable metrics. Diagnostic data, analytics, and/or log data may also be collected from network elements as a part of the monitoring of individual node and overall WAN states.

Input function 2825 comprises the WAN slice controller 410 determining data ingress and egress to and from WAN nodes and traffic routing throughout the 5G network in general and the WAN in particular. As shown by slicing function 2830, the WAN slice controller may utilize knowledge of network routing and WAN state to dynamically carve out optical spectrum to thereby instantiate a WAN slice on demand. The carve out may comprise selecting one or more wavelengths for the WAN slice, $\lambda_{slice}$, and determining nodes in the slice path so that applicable slice specifications and SLA guarantees may be achieved with minimal disruption to other WAN traffic that is not carried on the WAN slice.

Slicing function 2835 may comprise, in some implementations, a configuration of the WAN slice controller 410 to utilize a network optimization model, or other suitable functionality to dynamically determine an optimal configuration of WAN nodes. Such optimization can be expected to enhance responsiveness to on-demand requests for WAN slicing and/or end-to-end slicing. Such optimization may further streamline setup and provisioning of WAN network elements to implement guaranteed end-to-end services for customers.

Decision variables may include selection of one or more dedicated wavelengths and the WAN slice path. The objective function of the optimization model may include maximizing the availability of optical and router ports by bypassing nodes along the WAN slice path. It may be appreciated that constraints for the optimization model may deal with, for example, demand along all WAN routes for all traffic types (e.g., dedicated and non-dedicated), applicable QoS and SLA guarantees, capacity of a given WAN slice, total capacity of the WAN, the inherent bidirectionality of traffic capacity on the WAN, and network flow conservation. The decision variables and constraints described herein with respect to an optimization model are intended to be illustrative and it may be appreciated that various different models, variables, and constraints may be appropriately utilized to meet the needs of a particular implementation of WAN slicing.

Additional constraints may also arise, in some applications, by the interfaces between the WAN and the RAN and/or mobile core when implementing an end-to-end slicing construct. Non-technical constraints relating to legal, commercial, and policy factors may also limit possible values of the decision variables. For example, a WAN slice path may be limited to remaining within particular geographic boundaries, for example, due to privacy policies, government regulations, and the like.

Historical data may be collected and utilized in some cases by a predictive model. For example, analyses of a customer's historical traffic patterns on the 5G network, including the WAN and other network portions, may enable prediction of network conditions and traffic loading that are applicable to the WAN and its constituent slices. The WAN slice controller 410 can employ the predictive and/or optimization models to enhance responsiveness to on-demand WAN slice requests, for example, by pre-provisioning capacity and/or other appropriate resources in advance of anticipated demands.

The optimization and/or prediction models, or another suitable node and path selection methodology, may be utilized to pre-compute shortest paths between particular entry and destination nodes with maximum instances of optical bypass in intermediate nodes. The WAN slice controller 410 can select from among the pre-computed paths according to current or predicted traffic loads and/or WAN state, for example as measured by OSNR of each of the different available slice paths.

Slicing function 2840 may comprise the WAN slice controller provisioning dedicated capacity for the selected wavelength on a WAN slice from entry to destination node, and any intermediate nodes in between. The provisioning may comprise configuring the WAN slice network elements to instantiate data transport services to the customer on a dedicated wavelength that is contiguously-implemented across the nodes in the WAN slice path.

Slicing function 2845 may comprise the WAN slice controller 410 dynamically adapting a WAN slice as necessary to meet applicable SLA guarantees. For example, terminals at the WAN nodes can adjust modulation formats and/or data transmission rates to meet performance and capacity requirements for the WAN slice as the WAN state and traffic loads change or are predicted to change. Adaptations may also be implemented for non-dedicated traffic such as changing network provisioning or QoS when appropriate. For example, if network conditions dictate, non-dedicated traffic may be downgraded to best effort or non-guaranteed service to maintain a QoS guarantee for a WAN slice.

Adaptations may also include routing changes or instantiation of new WAN slice paths. In typical implementations, WAN state and associated traffic demand patterns will change in a predictable manner to enable effective modeling and control schemes to be implemented, such as pre-provisioning network elements and dedicated capacity. In cases of unpredictable events, such as fiber cuts and other network failures, dynamic resource allocation may be implemented among dedicated and non-dedicated traffic types.

Figure 29:
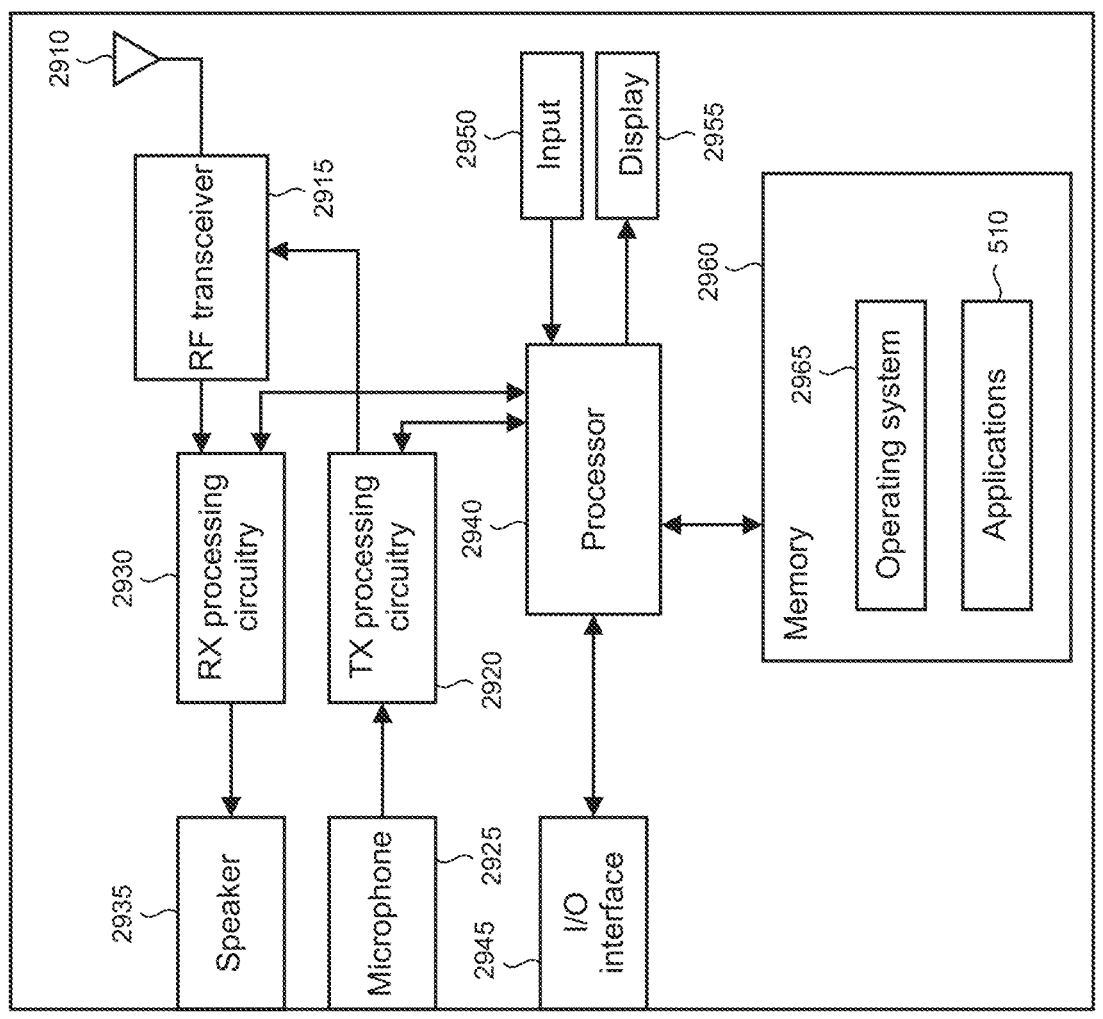
FIG. 29 is a block diagram of an illustrative UE that may be used at least in part to implement the present end-to-end secure communications for privileged 5G network traffic.

FIG. 29 is a block diagram of an illustrative UE 200 that may be used at least in part to implement the present end-to-end secure communications for privileged 5G network traffic. The embodiment of the UE 200 shown in FIG. 29 is for illustration only, and the UEs 200 shown in the drawings and described in the preceding text may have the same or similar configuration. However, it is noted that UEs may come in a wide variety of configurations, and FIG. 29 does not limit the scope of the present disclosure to any particular implementation of a UE.

The UE 200 includes an antenna 2910, a radio frequency (RF) transceiver 2915, transmit (TX) processing circuitry 2920, a microphone 2925, and receive (RX) processing circuitry 2930. The UE 200 also includes a speaker 2935, a processor 2940, an input/output (I/O) interface 2945, an input device 2950, a display 2955, and a memory 2960. The memory includes an operating system (OS) program 2965 and one or more applications 510.

The RF transceiver 2915 receives from the antenna 2910, an incoming RF signal transmitted by a gNB of a 5G network 500 (FIG. 5). The RF transceiver down-converts the incoming RF signal to generate an intermediate frequency (IF) or baseband signal. The IF or baseband signal is sent to the RX processing circuitry 2930, which generates a processed baseband signal by filtering, decoding, and/or digitizing the baseband or IF signal. The RX processing circuitry transmits the processed baseband signal to the speaker 2935 (such as for voice data) or to the processor 2940 for further processing (such as for web browsing data).

The TX processing circuitry 2920 receives analog or digital voice data from the microphone 2925 or other outgoing baseband data (such as web data, e-mail, or interactive video game data) from the processor 2940. The TX processing circuitry 2920 encodes, multiplexes, and/or digitizes the outgoing baseband data to generate a processed baseband or IF signal. The RF transceiver 2915 receives the outgoing processed baseband or IF signal from the TX processing circuitry and up-converts the baseband or IF signal to an RF signal that is transmitted via the antenna.

The processor 2940 can include one or more processors or other processing devices and execute the OS program 2965 stored in the memory 2960 to control the overall operation of the UE 200. For example, the processor may control the reception of forward channel signals and the transmission of reverse channel signals by the RF transceiver 2915, the RX processing circuitry 2930, and the TX processing circuitry 2920 in accordance with well-known principles. In some embodiments, the processor 2940 includes at least one microprocessor or microcontroller.

The processor 2940 may be configured for executing other processes and programs resident in the memory 2960, such as operations for CSI measurement and reporting for systems described in embodiments of the present disclosure. The processor can move data into or out of the memory as required by an executing process. In some embodiments, the processor may be configured to execute the applications 510 based on the OS program 2965 or in response to signals received from gNBs or an operator. The processor is also coupled to the I/O interface 2945, which provides the UE 200 with the ability to connect to other computing devices such as laptop computers and handheld computers. The I/O interface may thus function as a communication path between such accessories and the processor.

The processor 2940 is also coupled to the input device 2950 (e.g., keypad, touchscreen, buttons etc.) and the display 2955. A user of the UE 200 can typically employ the input device to enter data into the UE. For example, the display can be a liquid crystal display or other display capable of rendering text and/or graphics, video, etc., from web sites, applications and/or service providers.

The memory 2960 is coupled to the processor 2940. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 29 shows one illustrative example of UE 200, it may be appreciated that various changes may be made to the drawing. For example, various components may be combined, further subdivided, or omitted, and additional components may be added according to particular needs. As a particular example, the processor 2940 may be divided into multiple processors, such as one or more central processing units (CPUs) and one or more graphics processing units (GPUs). Also, while FIG. 29 depicts the UE 200 as configured as a mobile device, such as a smartphone, UEs may be configured to operate as other types of portable or stationary devices.

Figure 30:
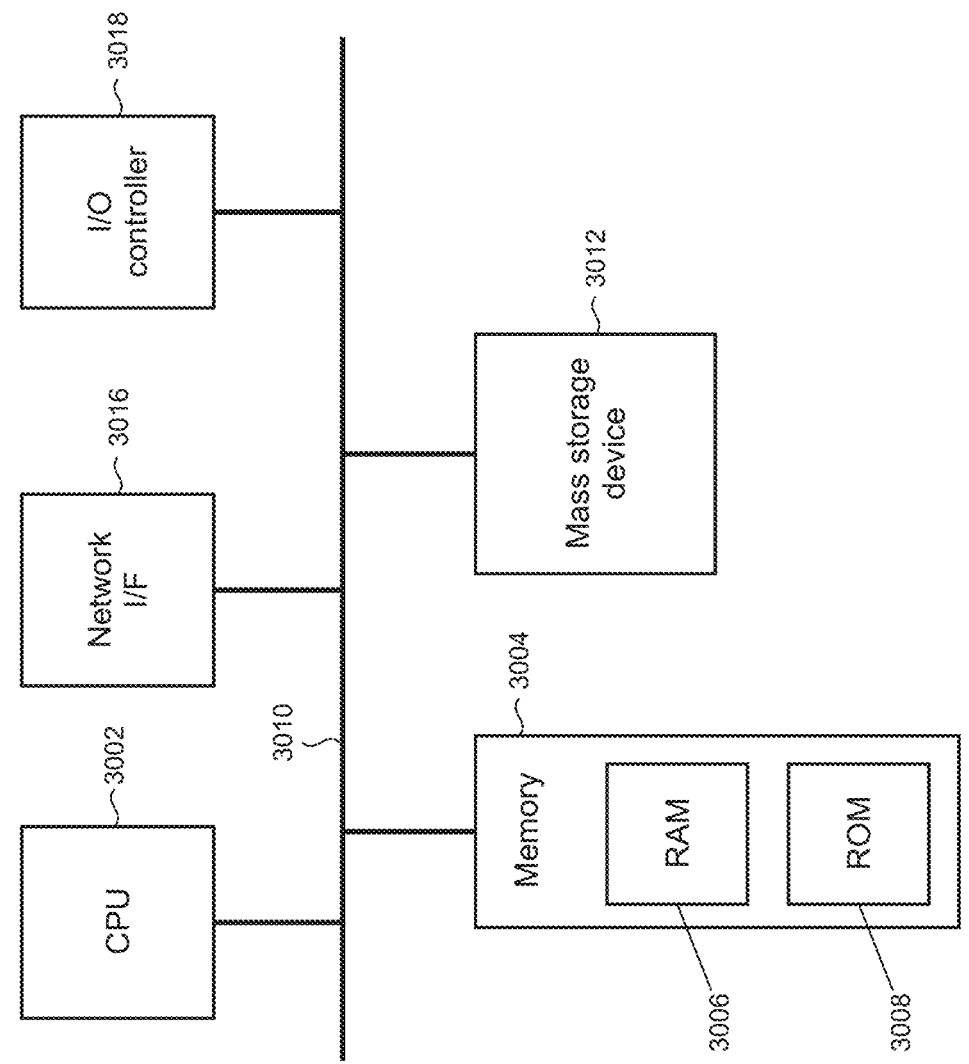
FIG. 30 is a block diagram of an illustrative server or computing device that may be used at least in part to implement the present end-to-end secure communications for privileged 5G network traffic.

FIG. 30 shows an illustrative architecture 3000 for a computing device, such as a server, capable of executing the various components described herein for end-to-end secure communications for privileged 5G network traffic. The architecture 3000 illustrated in FIG. 30 includes one or more processors 3002 (e.g., central processing unit, dedicated AI chip, graphics processing unit, etc.), a system memory 3004, including RAM (random access memory) 3006 and ROM (read only memory) 3008, and a system bus 3010 that operatively and functionally couples the components in the architecture 3000. A basic input/output system containing the basic routines that help to transfer information between elements within the architecture 3000, such as during startup, is typically stored in the ROM 3008. The architecture 3000 further includes a mass storage device 3012 for storing software code or other computer-executed code that is utilized to implement applications, the file system, and the operating system. The mass storage device 3012 is connected to the processor 3002 through a mass storage controller (not shown) connected to the bus 3010. The mass storage device 3012 and its associated computer-readable storage media provide non-volatile storage for the architecture 3000. Although the description of computer-readable storage media contained herein refers to a mass storage device, such as a hard disk or CD-ROM drive, it may be appreciated by those skilled in the art that computer-readable storage media can be any available storage media that can be accessed by the architecture 3000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3000.

According to various embodiments, the architecture 3000 may operate in a networked environment using logical connections to remote computers through a network. The architecture 3000 may connect to the network through a network interface unit 3016 connected to the bus 3010. It may be appreciated that the network interface unit 3016 also may be utilized to connect to other types of networks and remote computer systems. The architecture 3000 also may include an input/output controller 3018 for receiving and processing input from a number of other devices, including a keyboard, mouse, touchpad, touchscreen, control devices such as buttons and switches or electronic stylus (not shown in FIG. 30). Similarly, the input/output controller 3018 may provide output to a display screen, user interface, a printer, or other type of output device (also not shown in FIG. 30).

It may be appreciated that the software components described herein may, when loaded into the processor 3002 and executed, transform the processor 3002 and the overall architecture 3000 from a general-purpose computing system into a special-purpose computing system customized to facilitate the functionality presented herein. The processor 3002 may be constructed from any number of transistors or other discrete circuit elements, which may individually or collectively assume any number of states. More specifically, the processor 3002 may operate as a finite-state machine, in response to executable instructions contained within the software modules disclosed herein. These computer-executable instructions may transform the processor 3002 by specifying how the processor 3002 transitions between states, thereby transforming the transistors or other discrete hardware elements constituting the processor 3002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3000 in order to store and execute the software components presented herein. It also may be appreciated that the architecture 3000 may include other types of computing devices, including wearable devices, handheld computers, embedded computer systems, smartphones, PDAs, and other types of computing devices known to those skilled in the art. It is also contemplated that the architecture 3000 may not include all of the components shown in FIG. 30, may include other components that are not explicitly shown in FIG. 30, or may utilize an architecture completely different from that shown in FIG. 30.

Figure 31:
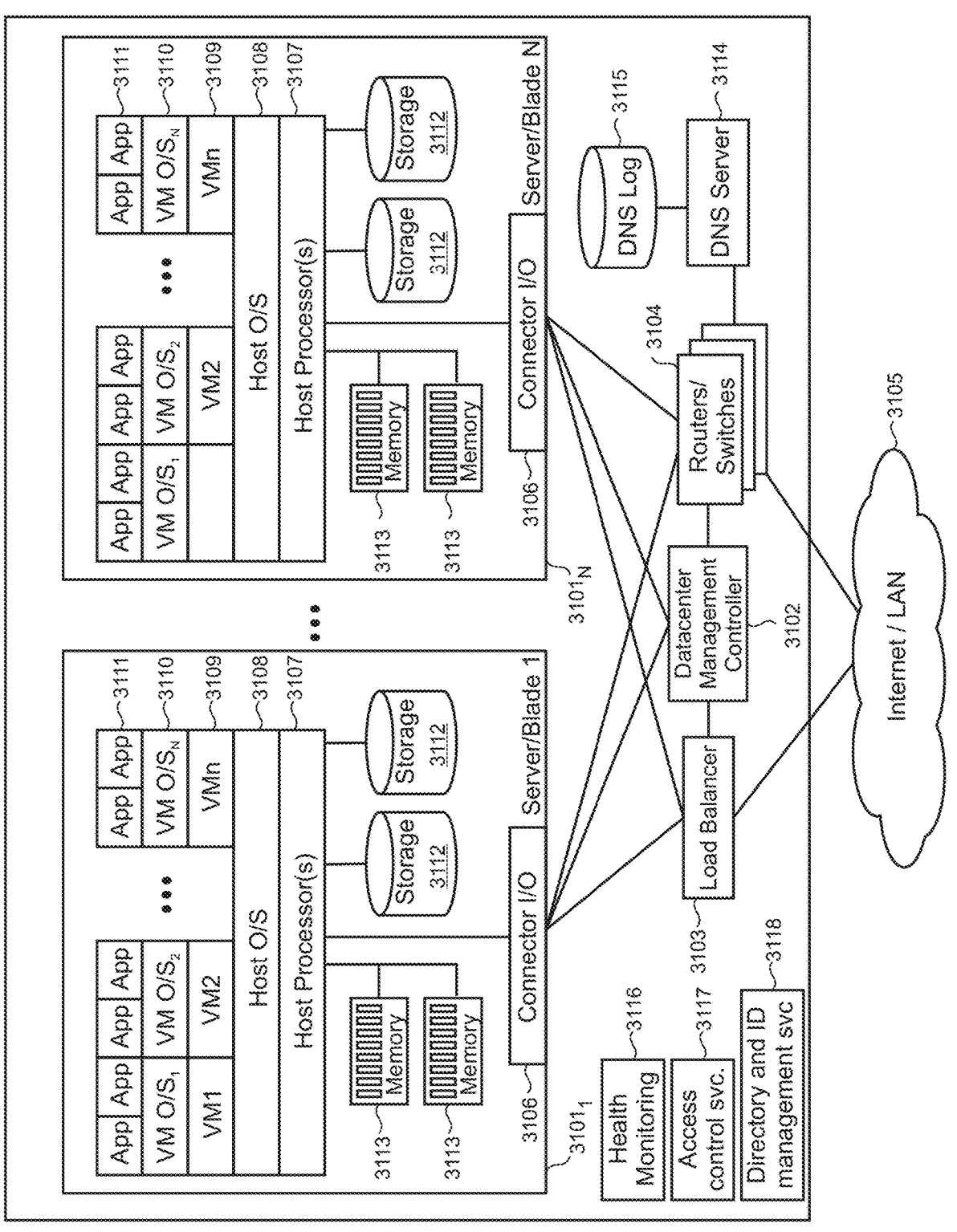
FIG. 31 is a block diagram of an illustrative datacenter that may be used at least in part to implement the present end-to-end secure communications for privileged 5G network traffic.

FIG. 31 is a high-level block diagram of an illustrative datacenter 3100 that provides cloud computing services or distributed computing services that may be used to implement the present end-to-end secure communications for privileged 5G network traffic. Datacenter 3100 may incorporate one or more of the features disclosed in the DCs shown in the drawings and described in the accompanying text. A plurality of servers 3101 are managed by datacenter management controller 3102. Load balancer 3103 distributes requests and computing workloads over servers 3101 to avoid a situation wherein a single server may become overwhelmed. Load balancer 3103 maximizes available capacity and performance of the resources in datacenter 3100. Routers/switches 3104 support data traffic between servers 3101 and between datacenter 3100 and external resources and users (not shown) via an external network 3105, which may be, for example, a local area network (LAN) or the Internet.

Servers 3101 may be standalone computing devices, and/or they may be configured as individual blades in a rack of one or more server devices. Servers 3101 have an input/output (I/O) connector 3106 that manages communication with other database entities. One or more host processors 3107 on each server 3101 run a host operating system (O/S) 3108 that supports multiple virtual machines (VM) 3109. Each VM 3109 may run its own O/S so that each VM O/S 3110 on a server is different, or the same, or a mix of both. The VM O/Ss 3110 may be, for example, different versions of the same O/S (e.g., different VMs running different current and legacy versions of the Windows® operating system). In addition, or alternatively, the VM O/Ss 3110 may be provided by different manufacturers (e.g., some VMs running the Windows® operating system, while other VMs are running the Linux® operating system). Each VM 3109 may also run one or more applications (App) 3111. Each server 3101 also includes storage 3112 (e.g., hard disk drives (HDD)) and memory 3113 (e.g., RAM) that can be accessed and used by the host processors 3107 and VMs 3109 for storing software code, data, etc. In one embodiment, a VM 3109 may employ the data plane APIs as disclosed herein.

Datacenter 3100 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 3100 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 3109 on server 3101₁ to run their applications 3111. When demand for an application 3111 increases, the datacenter 3100 may activate additional VMs 3109 on the same server 3101₁ and/or on a new server 3101N as needed. These additional VMs 3109 can be deactivated if demand for the application later drops.

Datacenter 3100 may offer guaranteed availability, disaster recovery, and back-up services. For example, the datacenter may designate one VM 3109 on server 3101₁ as the primary location for the tenant's application and may activate a second VM 3109 on the same or a different server as a standby or back-up in case the first VM or server 3101₁ fails. The datacenter management controller 3102 automatically shifts incoming user requests from the primary VM to the back-up VM without requiring tenant intervention. Although datacenter 3100 is illustrated as a single location, it will be understood that servers 3101 may be distributed to multiple locations across the globe to provide additional redundancy and disaster recovery capabilities. Additionally, datacenter 3100 may be an on-premises, private system that provides services to a single enterprise user or may be a publicly accessible, distributed system that provides services to multiple, unrelated customers and tenants or may be a combination of both.

Domain Name System (DNS) server 3114 resolves domain and host names into IP addresses for all roles, applications, and services in datacenter 3100. DNS log 3115 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 3116 monitors the health of the physical systems, software, and environment in datacenter 3100. Health monitoring 3116 provides feedback to datacenter managers when problems are detected with servers, blades, processors, or applications in datacenter 3100 or when network bandwidth or communications issues arise.

Access control service 3117 determines whether users are allowed to access particular connections and services provided at the datacenter 3100. Directory and identity management service 3118 authenticates user credentials for tenants on datacenter 3100.

Figure 32:
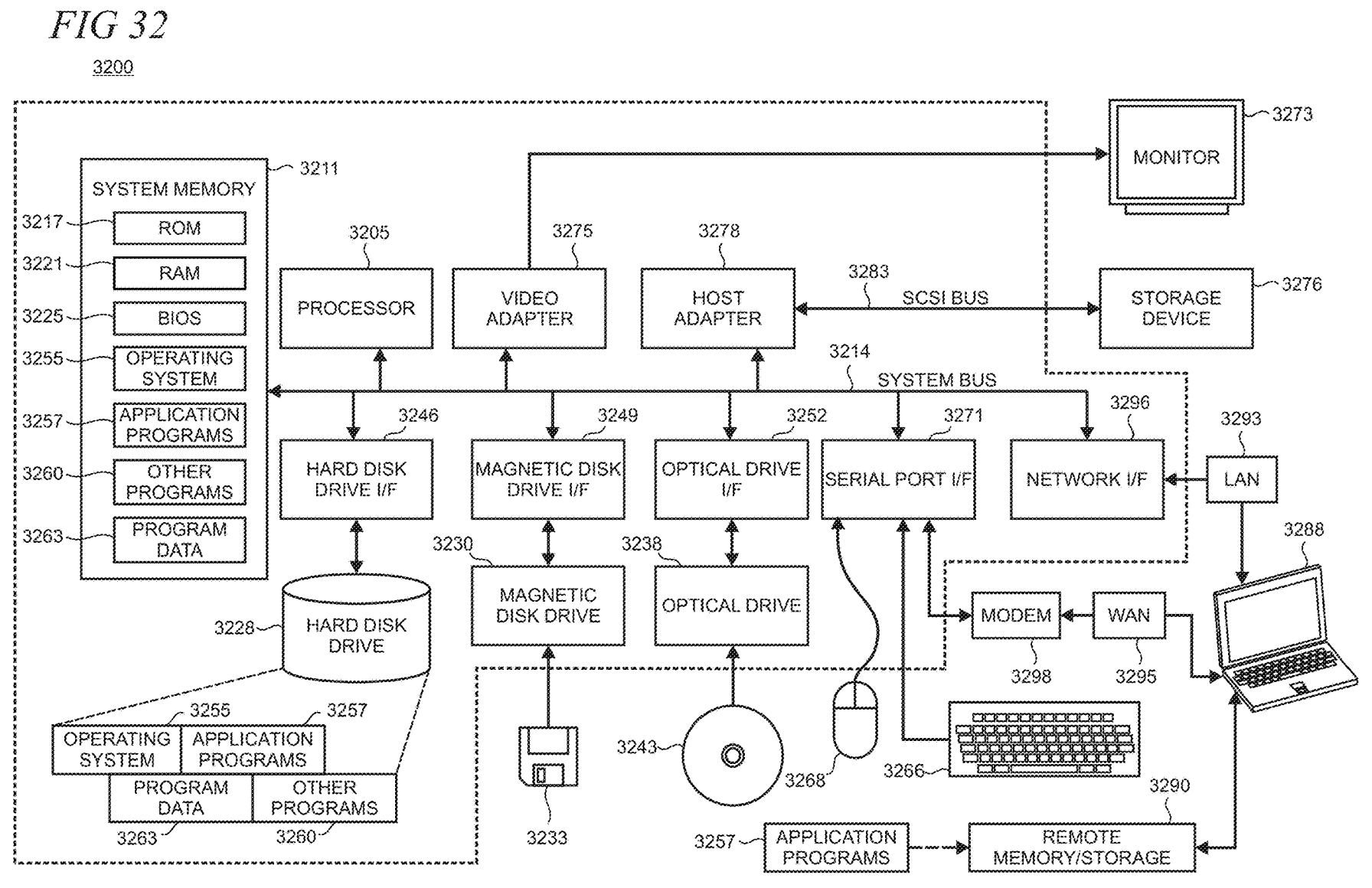

FIG. 32 is a simplified block diagram of an illustrative computer system 3200 such as a PC, client machine, or server with which the present end-to-end secure communications for privileged 5G network traffic may be implemented. Computer system 3200 includes a processor 3205, a system memory 3211, and a system bus 3214 that couples various system components including the system memory 3211 to the processor 3205. The system bus 3214 may be any of several types of bus structures including a memory bus or memory controller, a peripheral bus, or a local bus using any of a variety of bus architectures. The system memory 3211 includes read only memory (ROM) 3217 and random access memory (RAM) 3221. A basic input/output system (BIOS) 3225, containing the basic routines that help to transfer information between elements within the computer system 3200, such as during startup, is stored in ROM 3217. The computer system 3200 may further include a hard disk drive 3228 for reading from and writing to an internally disposed hard disk (not shown), a magnetic disk drive 3230 for reading from or writing to a removable magnetic disk 3233 (e.g., a floppy disk), and an optical disk drive 3238 for reading from or writing to a removable optical disk 3243 such as a CD (compact disc), DVD (digital versatile disc), or other optical media. The hard disk drive 3228, magnetic disk drive 3230, and optical disk drive 3238 are connected to the system bus 3214 by a hard disk drive interface 3246, a magnetic disk drive interface 3249, and an optical drive interface 3252, respectively. The drives and their associated computer-readable storage media provide non-volatile storage of computer-readable instructions, data structures, program modules, and other data for the computer system 3200. Although this illustrative example includes a hard disk, a removable magnetic disk 3233, and a removable optical disk 3243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present end-to-end secure communications for privileged 5G network traffic. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 3233, optical disk 3243, ROM 3217, or RAM 3221, including an operating system 3255, one or more application programs 3257, other program modules 3260, and program data 3263. A user may enter commands and information into the computer system 3200 through input devices such as a keyboard 3266 and pointing device 3268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 3205 through a serial port interface 3271 that is coupled to the system bus 3214, but may be connected by other interfaces, such as a parallel port, game port, or universal serial bus (USB). A monitor 3273 or other type of display device is also connected to the system bus 3214 via an interface, such as a video adapter 3275. In addition to the monitor 3273, personal computers typically include other peripheral output devices (not shown), such as speakers and printers. The illustrative example shown in FIG. 32 also includes a host adapter 3278, a Small Computer System Interface (SCSI) bus 3283, and an external storage device 3276 connected to the SCSI bus 3283.

The computer system 3200 is operable in a networked environment using logical connections to one or more remote computers, such as a remote computer 3288. The remote computer 3288 may be selected as another personal computer, a server, a router, a network PC, a peer device, or other common network node, and typically includes many or all of the elements described above relative to the computer system 3200, although only a single representative remote memory/storage device 3290 is shown in FIG. 32. The logical connections depicted in FIG. 32 include a local area network (LAN) 3293 and a wide area network (WAN) 3295. Such networking environments are often deployed, for example, in offices, enterprise-wide computer networks, intranets, and the Internet.

When used in a LAN networking environment, the computer system 3200 is connected to the local area network 3293 through a network interface or adapter 3296. When used in a WAN networking environment, the computer system 3200 typically includes a broadband modem 3298, network gateway, or other means for establishing communications over the wide area network 3295, such as the Internet. The broadband modem 3298, which may be internal or external, is connected to the system bus 3214 via a serial port interface 3271. In a networked environment, program modules related to the computer system 3200, or portions thereof, may be stored in the remote memory storage device 3290. It is noted that the network connections shown in FIG. 32 are illustrative and other means of establishing a communications link between the computers may be used depending on the specific requirements of an application of the present end-to-end secure communications for privileged 5G network traffic.

Various exemplary embodiments of the present end-to-end secure communications for privileged 5G network traffic are now presented by way of illustration and not as an exhaustive list of all embodiments. An example includes a computer-implemented method for providing an end-to-end slice of a 5G (fifth generation) network comprising a radio access network (RAN) and a wide area network (WAN), the method comprising: exposing a user interface to enable a user to select properties that are applicable to the end-to-end 5G network slice; implementing a RAN slice controller that is operatively coupled to physical infrastructure underlying the RAN including a radio frequency (RF) air interface to user equipment (UE) provided by a radio unit (RU); implementing a WAN slice controller that is operatively coupled to physical infrastructure underlying the WAN including one or more long-haul optical systems; and interoperating the RAN and WAN slice controllers over an interface to instantiate a 5G network slice that includes a slice of the RAN and a slice of the WAN and in which the selected properties are provisioned across the instantiated 5G network slice from end to end.

In another example, the RAN and WAN slice controllers are each instantiated as an SDN (software defined networking) element. In another example, the WAN further comprises a satellite link. In another example, the WAN slice comprises a discrete wavelength that is dedicated to data traffic traversing the 5G network slice. In another example, the interface exposes methods that enable the property of the 5G network slice to be provisioned across disparate domains. In another example, the user-selected property pertains to a guarantee for one of quality of service (QoS), security, privacy, or customer policy. In another example, the computer-implemented method further comprises allocating physical radio resources comprising subcarriers and time slots to the RAN slice. In another example, the computer-implemented method further comprises allocating optical spectrum comprising one or more wavelengths to the WAN slice. In another example, the computer-implemented method further comprises adding an identifier to data packets carried on the 5G network slice to identify data traffic that is subject to the selected properties. In another example, the selected property is a security property that is applied to privileged data traffic.

A further example includes one or more non-transitory computer-readable memory devices storing computer-executable instructions which, upon execution by one or more processors disposed in a computing device, cause the computing device to: create a WAN (wide area network) slice comprising a selected subset of nodes of a WAN that is utilized as a portion of a transport network of a 5G (fifth generation) network to provide point-to-point transport of 5G network traffic from an entry node to a destination node in an optical domain described by a selected wavelength that is contiguously utilized across the subset of nodes, the WAN slice including at least one intermediate node between the entry node and the destination node; create a RAN (radio access network) slice comprising a selected subset of physical radio resources that are applicable to an air interface of the RAN slice; stitch the created RAN slice and WAN slice together into an end-to-end 5G network slice from the air interface to the destination node over which privileged traffic is carried; and extend a security property across the end-to-end 5G network slice to the privileged traffic.

In another example, the security property provides a guarantee that the end-to-end network slice meets a predetermined level of isolation from other traffic carried on the 5G network. In another example, the wavelength is selected from a plurality of wavelengths in a wavelength division multiplexing (WDM) arrangement. In another example, at least one of the WAN nodes in the selected subset is located in a data center.

A further example includes a computing device operable on a 5G (fifth generation) network, comprising: at least one processor; and at least one hardware-based non-transitory computer-readable storage device having computer-executable instructions stored thereon which, when executed by the least one processor, cause the computing device to instantiate a slice controller on the computing device, the slice controller configured to create a 5G network slice from RF (radio frequency) and optical portions of the 5G network; expose a user interface to the instantiated slice controller that is configured to enable a user to select a property that is applicable to the created 5G network slice; dynamically operate the slice controller to control slicing of a wide area network (WAN) that provides transport network functionality for the 5G network, in which the WAN slicing comprises provisioning nodes of the WAN to utilize a selected wavelength to carry 5G network traffic in a WAN slice from an entry node, through zero or more intermediate nodes, to a destination node; dynamically operate the slice controller to control slicing of a radio access network (RAN)

by allocating physical resources to a RAN slice for an air interface of the RAN, in which the air interface provides access from user equipment (UE) to the RAN; and provision a user-selected property on the created 5G network slice comprising the RAN slice and WAN slice.

In another example, the physical resources comprise combinations of subcarrier and time slots. In another example, the executed computer-executable instructions further cause the computing device to perform core network slicing by deploying virtualized network functions in the 5G network slice. In another example, the provisioning is implemented using an end-to-end slice orchestration functionality. In another example, the executed instructions cause the slice controller to receive data describing state for each of the WAN and RAN, and in which the slice controller utilizes the received state data to maintain or modify the 5G network slice. In another example, the dynamic operations of the slice controller are performed in response to changing states of the 5G network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
implementing a software-defined network, comprising a plurality of virtualized network functions, to operate an end-to-end slice of a 5G (fifth generation) network, the 5G network comprising a radio access network (RAN), a multi-access edge compute (MEC) network, and a wide area network (WAN);
exposing a user interface to enable a user to select a property that is applicable to the end-to-end 5G network slice;
implementing a slice controller that is operatively coupled to physical infrastructure underlying the RAN including a radio frequency (RF) air interface to user equipment (UE) provided by a radio unit (RU), the slice controller being further operatively coupled to physical infrastructure underlying the MEC network and the WAN, wherein the WAN includes one or more longhaul optical systems; and
operating the slice controller to instantiate the end-to-end 5G network slice, the instantiated end-to-end 5G network slice including a slice of the RAN, a slice of the MEC network, and a slice of the WAN, wherein the user-selected property is provisioned across the instantiated 5G network slice from end to end.

2. The computer-implemented method of claim 1 in which the WAN further comprises a satellite link.

3. The computer-implemented method of claim 1 in which the WAN slice comprises a discrete wavelength that is dedicated to data traffic traversing the 5G network slice.

4. The computer-implemented method of claim 1 in which the interface exposes methods that enable the properties of the 5G network slice to be provisioned across disparate domains.

5. The computer-implemented method of claim 1 in which the user-selected property pertains to a guarantee for one of quality of service (QoS), security, privacy, or customer policy.

6. The computer-implemented method of claim 1 further comprising allocating physical radio resources comprising subcarriers and time slots to the RAN slice.

7. The computer-implemented method of claim 1 further comprising allocating optical spectrum, comprising one or more wavelengths, to the WAN slice.

8. The computer-implemented method of claim 1 further comprising adding an identifier to data packets carried on the 5G network slice to identify data traffic that is subject to the user-selected property.

9. The computer-implemented method of claim 8 in which the user-selected property comprises a security property that is applied to privileged data traffic.

10. One or more non-transitory computer-readable memory devices storing computer-executable instructions which, upon execution by one or more processors disposed in a computing device, cause the computing device to:

create a WAN (wide area network) slice comprising a selected subset of nodes of a WAN that is utilized as a portion of a transport network of a 5G (fifth generation) network to provide point-to-point transport of 5G network traffic from an entry node to a destination node in an optical domain described by a selected wavelength that is contiguously utilized across the subset of nodes, the WAN slice including at least one intermediate node between the entry node and the destination node;

create a RAN (radio access network) slice comprising a selected subset of physical radio resources that are applicable to an air interface of the RAN slice, wherein the RAN slice is instantiated from a multi-access compute (MEC) network providing access for user equipment (UE) to the air interface;

stitch the created RAN slice and WAN slice together into an end-to-end 5G network slice, from the air interface to the destination node, over which privileged traffic is carried; and extend a security property to the privileged traffic across the end-to-end 5G network slice.

11. The one or more non-transitory computer-readable memory devices of claim 10 in which the security property provides a guarantee that the end-to-end network slice meets a predetermined level of isolation from other traffic carried on the 5G network.

12. The one or more non-transitory computer-readable memory devices of claim 10 in which the wavelength is selected from a plurality of wavelengths in a wavelength division multiplexing (WDM) arrangement.

13. The one or more non-transitory computer-readable memory devices of claim 10 in which the air interface comprises Wi-Fi access or cellular access.

14. The one or more non-transitory computer-readable memory devices of claim 10 in which at least one of the WAN nodes in the selected subset is located in a data center.

15. A computing device operable on a 5G (fifth generation) network, comprising:

at least one processor; and at least one hardware-based non-transitory computer-readable storage device having computer-executable instructions stored thereon which, when executed by the least one processor, cause the computing device to instantiate a slice controller on the computing device, the computing device being operable in a multi-access edge compute (MEC) network that includes a radio access network (RAN) which provides access to user equipment (UE) to the 5G network, the slice controller being configured to create a 5G network slice from RF (radio frequency) and optical portions of the 5G network;

expose a user interface to the instantiated slice controller that is configured to enable a user to select a property that is applicable to the created 5G network slice;

dynamically operate the slice controller to control slicing of a wide area network (WAN) that provides transport network functionality for the 5G network, in which the WAN slicing comprises provisioning nodes of the WAN to utilize a selected wavelength to carry 5G network traffic in a WAN slice from an entry node, through zero or more intermediate nodes, to a destination node;

dynamically operate the slice controller to control slicing of the RAN by allocating physical resources to a RAN slice for an air interface of the RAN; and provision a user-selected property on the created 5G network slice comprising the RAN slice and WAN slice.

16. The computing device of claim 15 in which the physical resources comprise combinations of subcarrier and time slots.

17. The computing device of claim 15 in which the executed computer-executable instructions further cause the computing device to perform core network slicing by deploying virtualized network functions in the 5G network slice.

18. The computing device of claim 15 in which the provisioning is implemented using an end-to-end slice orchestration functionality.

19. The computing device of claim 15 in which the executed instructions cause the slice controller to receive data describing state for each of the WAN and RAN, and in which the slice controller utilizes the received state data to maintain or modify the 5G network slice.

20. The computing device of claim 15 in which the dynamic operations of the slice controller are performed in response to changing states of the 5G network.

* * * * *